United States Patent
Fujioka et al.

(10) Patent No.: US 10,148,922 B2
(45) Date of Patent: Dec. 4, 2018

(54) DISPLAY SYSTEM

(71) Applicant: CANON KABUSHIKI KAISHA, Tokyo (JP)

(72) Inventors: Masaki Fujioka, Chiba (JP); Norihiro Kawahara, Kawasaki (JP); Kohei Murayama, Kawasaki (JP); Yoshio Nishioka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 21 days.

(21) Appl. No.: 14/997,391

(22) Filed: Jan. 15, 2016

(65) Prior Publication Data

US 2016/0212393 A1 Jul. 21, 2016

(30) Foreign Application Priority Data

Jan. 19, 2015 (JP) ................... 2015-007830

(51) Int. Cl.
*H04N 5/66* (2006.01)
*H04N 9/12* (2006.01)
(Continued)

(52) U.S. Cl.
CPC ......... *H04N 9/3179* (2013.01); *G06F 3/1446* (2013.01); *H04N 9/3147* (2013.01)

(58) Field of Classification Search
CPC ... H04N 9/3179; H04N 9/3147; G06F 3/1446
USPC ......... 348/383, 333.03, 333.04, 333.05, 194, 348/211.1, 211.3, 211.2, 231.5, 423.1, 348/439.1, 464, 495, 500, 513, 521, 564, 348/565, 567, 569, 665, 670, 706, 714, 348/719, 723, 725; 345/1.3, 2.2, 173, 345/504, 584; 709/208, 209, 211; 710/45, 110
See application file for complete search history.

(56) References Cited

U.S. PATENT DOCUMENTS 7,042,514 B1 * 5/2006 Ishihara ............. H04N 1/00294
348/552
8,547,573 B2 * 10/2013 Suga .................. H04N 1/00233
358/1.13
(Continued)

FOREIGN PATENT DOCUMENTS

CN 101149913 A 3/2008
CN 100580764 C 1/2010
(Continued)

*Primary Examiner* — Jefferey F Harold
*Assistant Examiner* — Mustafizur Rahman
(74) *Attorney, Agent, or Firm* — Canon U.S.A., Inc. IP Division

(57) ABSTRACT

A display system includes a master device that displays a master image corresponding to a part of image data, and a slave device that displays a slave image corresponding to another part of the image data. The slave device includes a slave signal generation unit that starts to generate a slave timing signal at a predetermined interval with reference to a timing based on a first instruction received from the master device, a slave communication unit that transmits to the master device a completion notification indicating that a preparation for displaying the slave image is completed, and a slave display unit that displays the slave image in synchronization with the slave timing signal corresponding to a second instruction received from the master device.

14 Claims, 14 Drawing Sheets

(51) Int. Cl.
*H04N 9/31* (2006.01)
*G06F 3/14* (2006.01)

(56) References Cited

U.S. PATENT DOCUMENTS

| | | | | |
|---|---|---|---|---|
| 8,954,609 | B1* | 2/2015 | Holleman | H04L 69/28 709/203 |
| 2004/0017486 | A1* | 1/2004 | Cooper | H04N 5/073 348/211.1 |
| 2005/0219225 | A1* | 10/2005 | Dunn | G09B 5/02 345/173 |
| 2006/0109349 | A1* | 5/2006 | Takashima | G06F 13/385 348/207.1 |
| 2007/0078005 | A1* | 4/2007 | Shiraiwa | A63F 13/10 463/43 |
| 2009/0187105 | A1* | 7/2009 | Ichikawa | A61B 8/12 600/444 |
| 2010/0135334 | A1* | 6/2010 | Briscoe | H04J 3/0664 370/503 |
| 2010/0182195 | A1* | 7/2010 | Garin | G01S 5/0284 342/357.22 |
| 2011/0141232 | A1* | 6/2011 | Tsukagoshi | G06F 8/65 348/43 |
| 2012/0044985 | A1* | 2/2012 | Tao | H04N 21/234363 375/240.01 |
| 2012/0113113 | A1* | 5/2012 | Hong | H04N 13/0059 345/419 |
| 2013/0003621 | A1* | 1/2013 | Huang | H04L 65/00 370/310 |
| 2013/0009998 | A1 | 1/2013 | Hsieh | |
| 2013/0135526 | A1* | 5/2013 | Minemura | H04N 5/04 348/515 |
| 2013/0191563 | A1* | 7/2013 | Toba | H04N 5/775 710/62 |
| 2013/0195119 | A1* | 8/2013 | Huang | H04L 65/4092 370/468 |
| 2013/0222699 | A1* | 8/2013 | Wang | H04N 21/4307 348/719 |
| 2013/0223538 | A1* | 8/2013 | Wang | H04N 21/4307 375/240.25 |
| 2013/0238702 | A1* | 9/2013 | Sheth | H04L 67/38 709/204 |
| 2014/0071236 | A1* | 3/2014 | Tsukagoshi | H04N 13/0059 348/43 |
| 2014/0184642 | A1* | 7/2014 | Kitahara | H04N 21/4223 345/629 |
| 2014/0240604 | A1* | 8/2014 | Toba | H04N 21/43635 348/723 |
| 2014/0358981 | A1* | 12/2014 | Miyake | H04L 67/1095 709/201 |
| 2015/0085171 | A1* | 3/2015 | Kim | H04N 1/00183 348/333.04 |
| 2015/0201023 | A1* | 7/2015 | Kotab | H04L 65/60 709/208 |
| 2015/0381954 | A1* | 12/2015 | Asamura | H04N 9/3147 348/383 |
| 2016/0065829 | A1* | 3/2016 | Kiso | H04N 5/23206 348/211.3 |
| 2016/0098240 | A1* | 4/2016 | Hong | G06F 3/1446 345/1.3 |
| 2016/0198198 | A1* | 7/2016 | Iwami | H04N 21/2385 725/116 |

FOREIGN PATENT DOCUMENTS

| | | |
|---|---|---|
| CN | 101647273 A | 2/2010 |
| CN | 103858436 A | 6/2014 |
| CN | 104077963 A | 10/2014 |
| JP | H06-242747 A | 9/1994 |
| JP | H09-120277 A | 5/1997 |
| JP | 2000322039 A | 11/2000 |
| WO | 2006/025093 A1 | 3/2006 |
| WO | 2012157722 A1 | 11/2012 |

\* cited by examiner

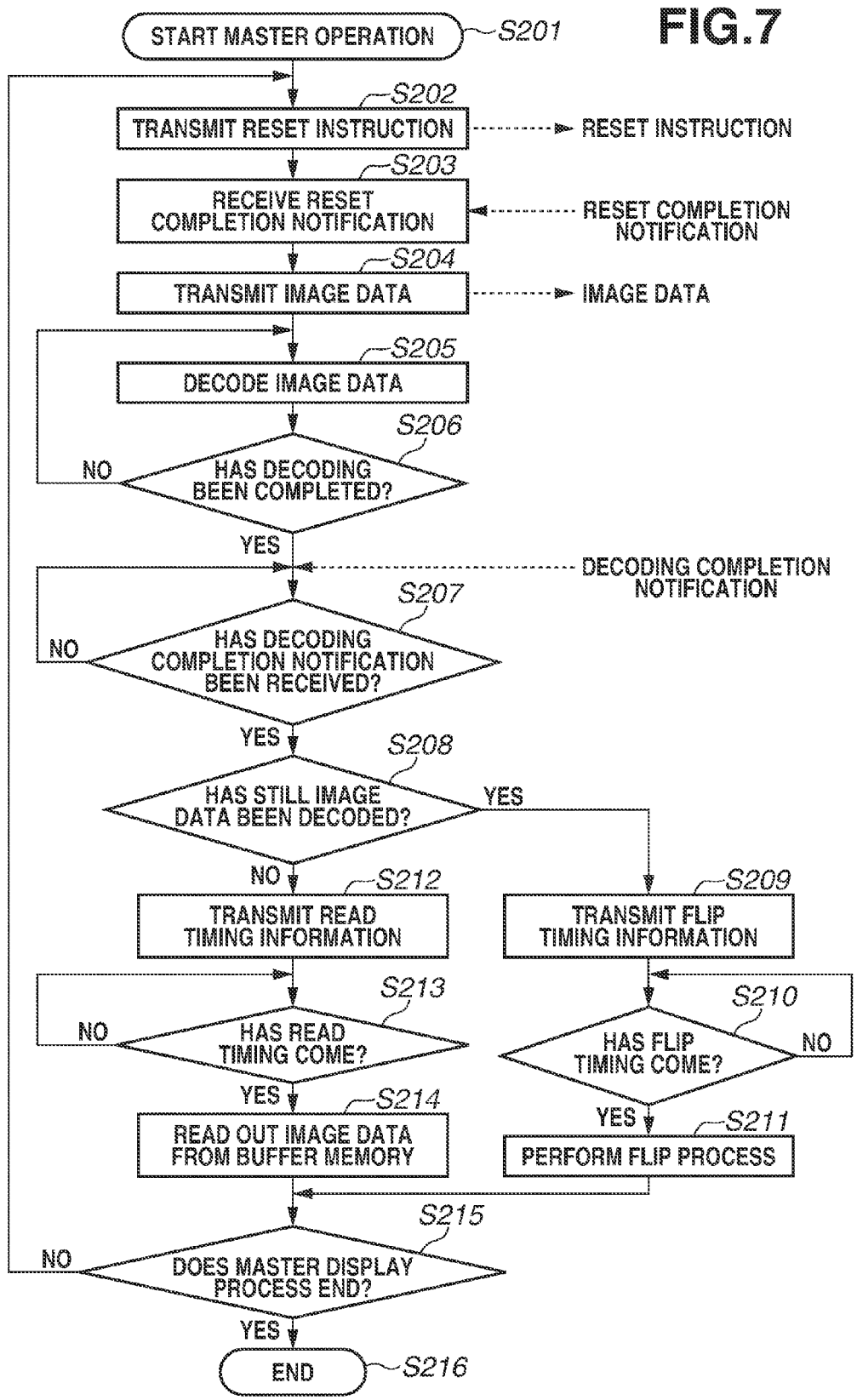

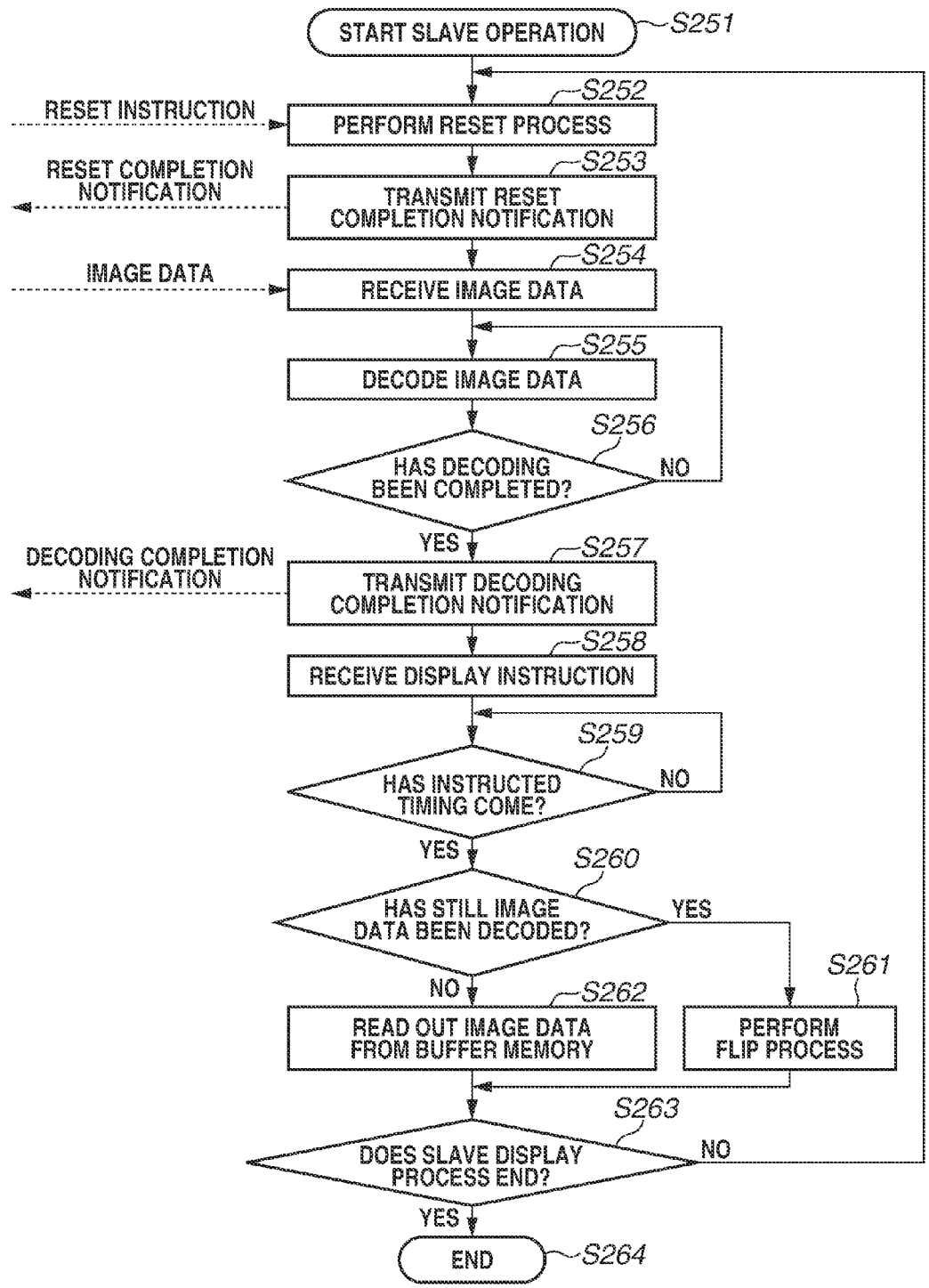

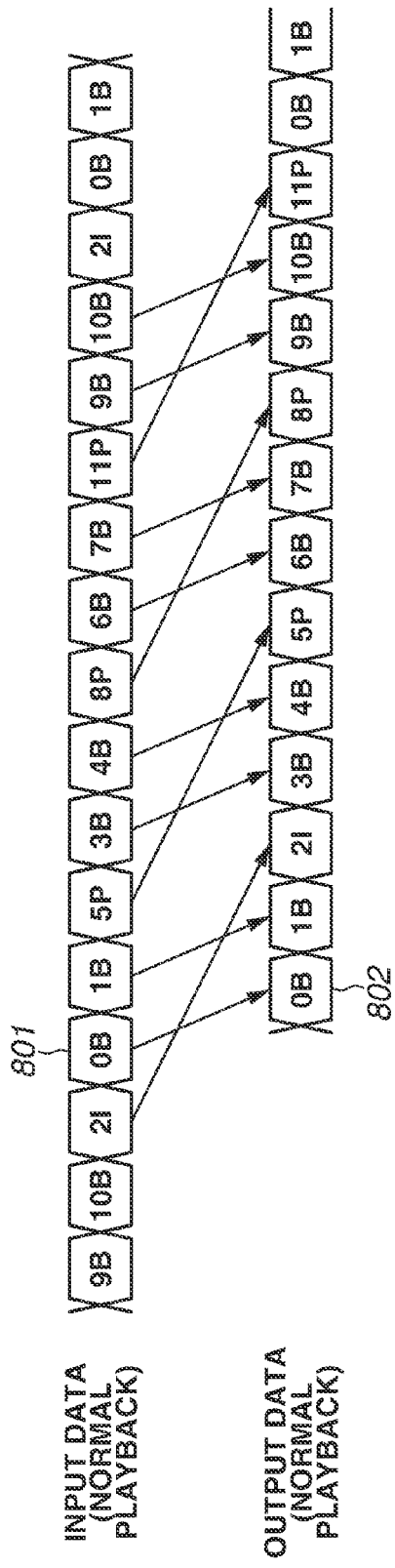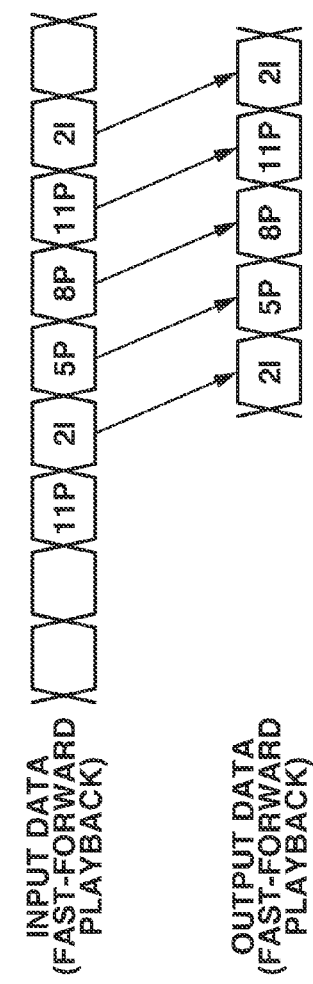

DISPLAY SYSTEM

BACKGROUND

Field of the Invention

The present invention relates to an apparatus and a method for displaying an image, and a system and a method for displaying an image using display apparatuses.

Description of the Related Art

International Publication No. 2006/025093 discusses a screen synchronization control apparatus that transmits a reference timing signal to display processing units at a predetermined interval.

In International Publication No. 2006/025093, each of the display processing units switches a display screen to match a vertical synchronization signal immediately after receiving a drawing instruction transmitted from a screen synchronization control apparatus. In a control method discussed in International Publication No. 2006/025093, if the respective vertical synchronization signals in the display processing units are not synchronized, a timing of when the display screen is switched differs in each of the display processing units. For example, when multi-image display is performed using the display processing units, if there is no method for synchronizing the respective vertical synchronization signals in the display processing units, a timing of when the display screen is switched differs in each of the display processing units. As a result, the display quality of an image to be multi-screen displayed may deteriorate.

SUMMARY

According to an aspect of the present invention, in a display system for displaying one image using display apparatuses, deterioration of the display quality of the image can be reduced.

According to another aspect of the present invention, in a display system for displaying one image using display apparatuses, a departure in a timing of when the image is switched among the display apparatuses can be reduced.

According to another aspect of the present invention, there is provided a display system including a master device that displays a master image corresponding to a part of image data, and a slave device that displays a slave image corresponding to another part of the image data. The slave device includes, a slave signal generation unit that starts to generate a slave timing signal at a predetermined interval with reference to a timing based on a first instruction received from the master device, a slave communication unit that transmits to the master device a completion notification indicating that a preparation for displaying the slave image is completed, and a slave display unit that displays the slave image in synchronization with the slave timing signal corresponding to a second instruction received from the master device.

Further features and aspects of the present invention will become apparent from the following description of exemplary embodiments.

BRIEF DESCRIPTION OF THE DRAWINGS

FIG. 7 is a flowchart for illustrating a master display process performed in a projector 100a in the second exemplary embodiment.

FIG. 8 is a flowchart for illustrating a slave display process in each of projectors 100b to 100d in the second exemplary embodiment.

FIGS. 9A and 9B respectively illustrate configuration examples of moving image data.

DESCRIPTION OF THE EMBODIMENTS

Exemplary embodiments, features, and aspects of the present invention will be described below with reference to the drawings.

Figure 1:
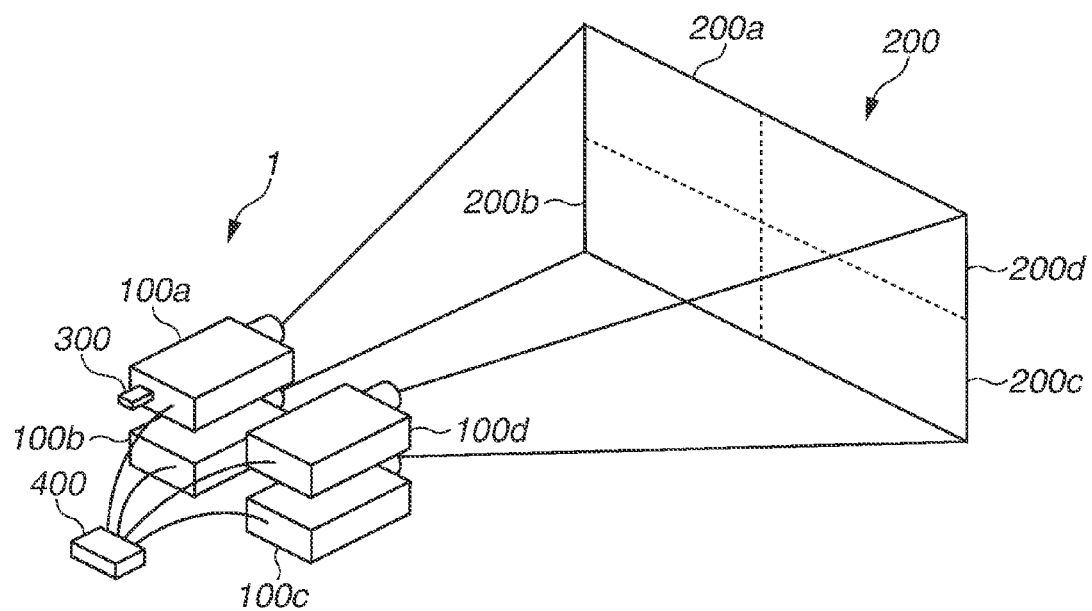
FIG. 1 illustrates a configuration of a display system 1 according to each of first to fifth exemplary embodiments.

A first exemplary embodiment will be described below. FIG. 1 illustrates a configuration of a display system 1 according to each of first to fifth exemplary embodiments. The display system 1 includes display apparatuses that can communicate with one another. The plurality of display apparatuses includes projectors 100a, 100b, 100c, and 100d. Each of the projectors 100a, 100b, 100c, and 100d displays an image based on a part of image data A on a screen 200. The projectors 100a, 100b, 100c, and 100d are referred to as projectors 100a to 100d, and the projectors 100b, 100c, and 100d are referred to as projectors 100b to 100d.

A universal serial bus (USE) memory 300 storing image data A is connected to the projector 100a. The image data A is either one of still image data and moving image data, and is stored in the USE memory 300 in a predetermined file format. The projector 100a reads out the image data A from the USE memory 300, and displays an image generated by processing an area of at least a part of the read image data A on a screen 200. In the present specification, image data processed by the projector 100a is referred to as master image data.

Each of the projectors 100b to 100d displays an image generated by processing an area of at least a part of the image data A received from the projector 100a on the screen 200. In the present specification, image data processed by the projector 100b is referred to as slave image data b, image data processed by the projector 100c is referred to as slave image data c, and image data processed by the projector 100d is referred to as slave image data d.

A hub 400 is a network hub. The hub 400 is connected to the projectors 100a to 100d via a local area network (LAN)

cable, and the projectors 100a to 100d communicate with one another via the hub 400. For example, the projector 100a serving as a master device transmits an instruction packet to the projectors 100b to 100d. Each of the projectors 100b to 100d serving as slave devices transmits a response packet corresponding to the instruction received from the projector 100a. Furthermore, the projector 100a transmits the image data A read out of the USE memory 300 to the projectors 100b to 100d via the hub 400.

The projectors 100a to 100d respectively extract different predetermined areas from the image data A, to generate master image data, slave image data b, slave image data c, and slave image data d. The projectors 100a to 100d respectively display images based on the master image data, the slave, image data b, the slave image data c, and the slave image data d on different areas of the screen 200. Thus, an image based on the image data A is displayed on the screen 200.

Respective configurations of the projectors 100a to 100d serving as the display apparatuses will be described below. The projectors 100a to 100d respectively have the same configurations. A user can set the projector 100a to function as a master device and set the projectors 100b to 100d to respectively function as slave devices by operating operation units provided in the projectors 100a to 100d.

Figure 2:
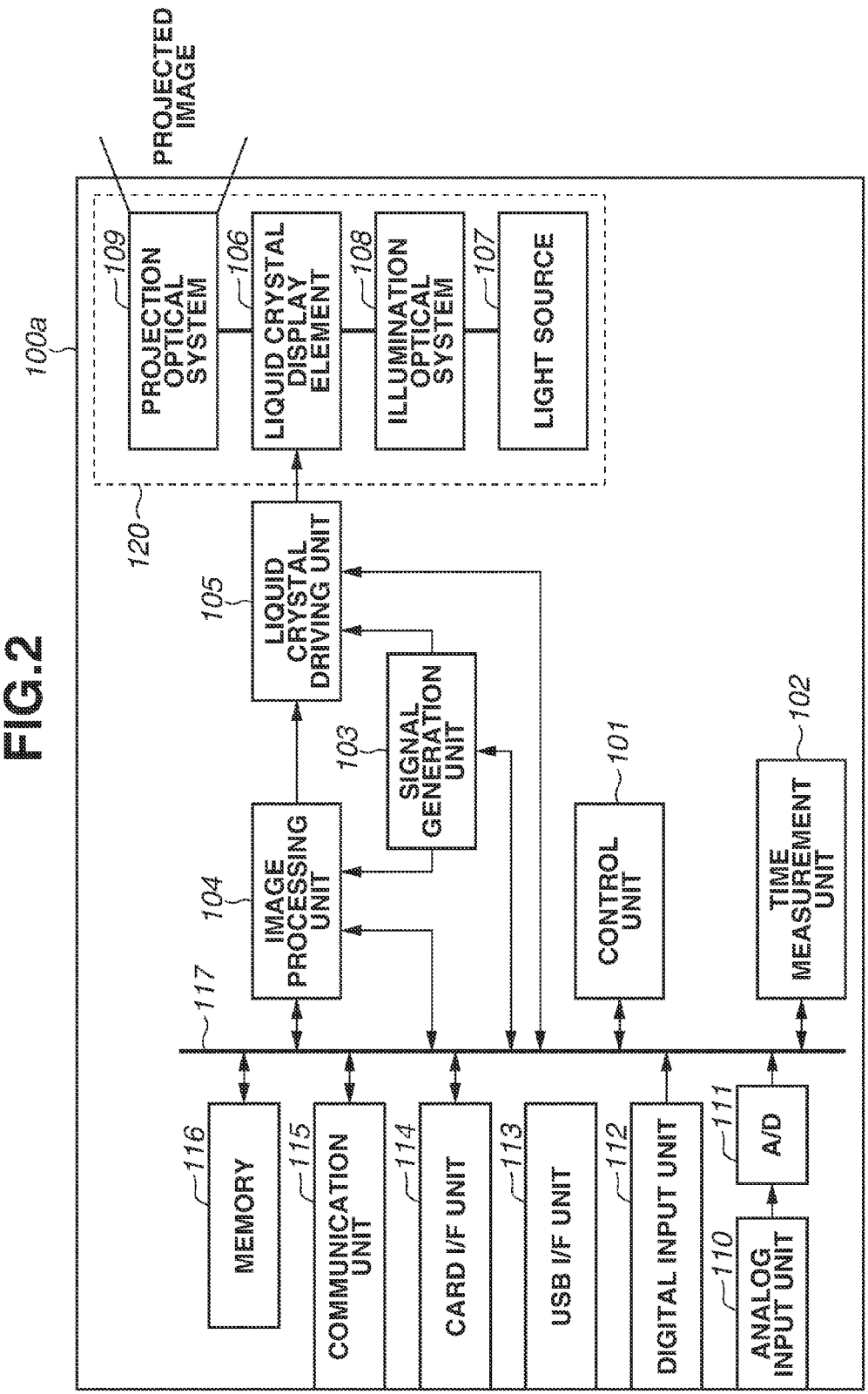
FIG. 2 illustrates configurations of projectors 100a to 100d.

FIG. 2 illustrates configurations of the projectors 100a to 100d. The projectors 100a to 100d respectively have the same configurations. Therefore, in FIG. 2, the configuration of the projector 100a will be described for simplification of illustration, and description of the configurations of the projectors 100b to 100d is not repeated. The projector 100a includes a control unit 101, a time measurement unit 102, a signal generation unit 103, an image processing unit 104, a liquid crystal driving unit 105, a liquid crystal display element 106, a light source 107, an illumination optical system 108, and a projection optical system 109. The projector 100a further includes an analog input unit 110, an analog-to-digital (A/D) converter 111, a digital input unit 112, a USB interface unit 113, a card interface unit 114, a communication unit 115, a memory 116, and a bus 117.

The control unit 101 is a central processing unit (CPU) that controls each of units in the projector 100a by executing a program stored in the memory 116. For example, the control unit 101 conveys to the signal generation unit 103 a generation timing of a vertical synchronization signal and a frame rate based on at least one of a content of a reset instruction received via the communication unit 115 and a timing of when the reset instruction has been received.

The time measurement unit 102 measures an elapsed period of time after a predetermined event has occurred. For example, the time measurement unit 102 starts and ends time measurement based on the instruction from the control unit 101, and outputs an elapsed period of time until the time measurement is ended from starting measurement.

The signal generation unit 103 generates the vertical synchronization signal to be input to the image processing unit 104 and the liquid crystal driving unit 105 at a predetermined interval. The signal generation unit 103 can change the generation timing of the vertical synchronization signal in response to the instruction from the control unit 101. Furthermore, the signal generation unit 103 has a counter, and counts using the counter how many times a leading edge or a trailing edge of the vertical synchronization signal is generated. The signal generation unit 103 in the projector 100a acts as a master signal generation unit, and the signal generation unit 103 in each of the projectors 100b to 100d acts as a slave signal generation unit.

The image processing unit 104 decodes image data, extracts image data in a predetermined area of the decoded image data, and performs image processing such as color correction and luminance correction of the image data. The image processing unit 104 in the projector 100a acts as a master image generation unit, and the image processing unit 104 in each of the projectors 100b to 100d acts as a slave image generation unit.

The liquid crystal driving unit 105 generates a driving signal of the liquid crystal display element 106. Furthermore, the liquid crystal driving unit 105 subjects the image data input from the image processing unit 104 to correction such as gamma correction, color unevenness correction, or overdrive correction, to generate image data for projection of a project image on the liquid crystal display element 106.

The liquid crystal display element 106 forms the project image based on the image data for projection input from the liquid crystal driving unit 105. The liquid crystal display element 106 includes one or display elements. The liquid crystal display element 106 in the projector 100a acts as a master display unit, and the image processing unit 104 in each of the projectors 100b to 100d acts as a slave image display unit.

The light source 107 feeds light to the liquid crystal display element 106. The illumination optical system 108 parallelizes the light emitted from the light source 107, and outputs the parallelized light as a light flux. The projection optical system 109 displays an optical image obtained by feeding the light emitted from the light source 107 to the liquid crystal display element 106 as a project image on the screen 200 illustrated in FIG. 1. The liquid crystal display element 106, the light source 107, the illumination optical system 108, and the projection optical system 109 are components constituting the display unit 120.

The analog input unit 110 can receive an analog video signal output from a personal computer, a Digital Versatile Disk (DVD) player, or a television tuner. The analog input unit 110 includes a Red-Green-Blue (RGB) terminal and a Separate (S) terminal, for example.

The A/D converter 111 converts the analog video signal, which has been input via the analog input unit 110, into a digital signal.

The digital input unit 112 can receive the digital video signal output from the personal computer, the DVD player, or the like. The digital input unit 112 includes a High-Definition Multimedia Interface (HDMI) (registered trademark) terminal, for example. If the digital input unit 112 is the HDMI terminal, the digital input unit 112 receives a control signal used for controlling the projector 100a via an HDMI cable, and outputs the received control signal to the control unit 101.

The USB interface unit 113 can receive the image data A such as the still image data or the moving image data, and can transmit the image data A to an external device. A pointing device, a keyboard, or a USB-type flash memory is connected to the USB interface unit 113. In the example illustrated in FIG. 1, the USB memory 300 storing the image data A is connected to the USB interface unit 113 in the projector 100a.

The card interface unit 114 includes a connection mechanism for housing a card-type recording medium. The card interface unit 114 can write image data into the recording medium connected to the card interface unit 114 according to the instruction from the control unit 101. The card interface unit 114 can also read out image data from the recording medium connected to the card interface unit 114 according to the instruction from the control unit 101. A memory card such as a Secure Digital (SD) card or CompactFlash (registered trademark) can be inserted into the card interface unit 114.

The communication unit 115 can communicate with an apparatus connected via an intranet or the Internet. The communication unit 115 can transmit or receive the image data A, and can transmit or receive various types of instruction signals. The communication unit 115 includes at least one of a wired LAN interface portion and a wireless LAN interface portion, for example. In the example illustrated in FIG. 1, the projector 100a can communicate with the projectors 100b to 100d via the communication unit 115. The communication unit 115 in the projector 100a acts as a master communication unit, and the communication unit 115 in each of the projectors 100b to 100d acts as a slave communication unit.

The memory 116 can store image data such as the image data A, and can store a program to be executed by the control unit 101. The memory 116 includes semiconductor memories such as a read-only memory (ROM) and a random access memory (RAM).

The bus 117 is a data bus and an address bus for and receiving data between the control unit 101 and each of the components of the projector 100a.

In the projector 100a, image data is received from any one of the analog input unit 110, the digital input unit 112, the USB interface unit 113, the card interface unit 114, and the communication unit 115. The received image data is input to the image processing unit 104 under the control of the control unit 101.

Figure 3:
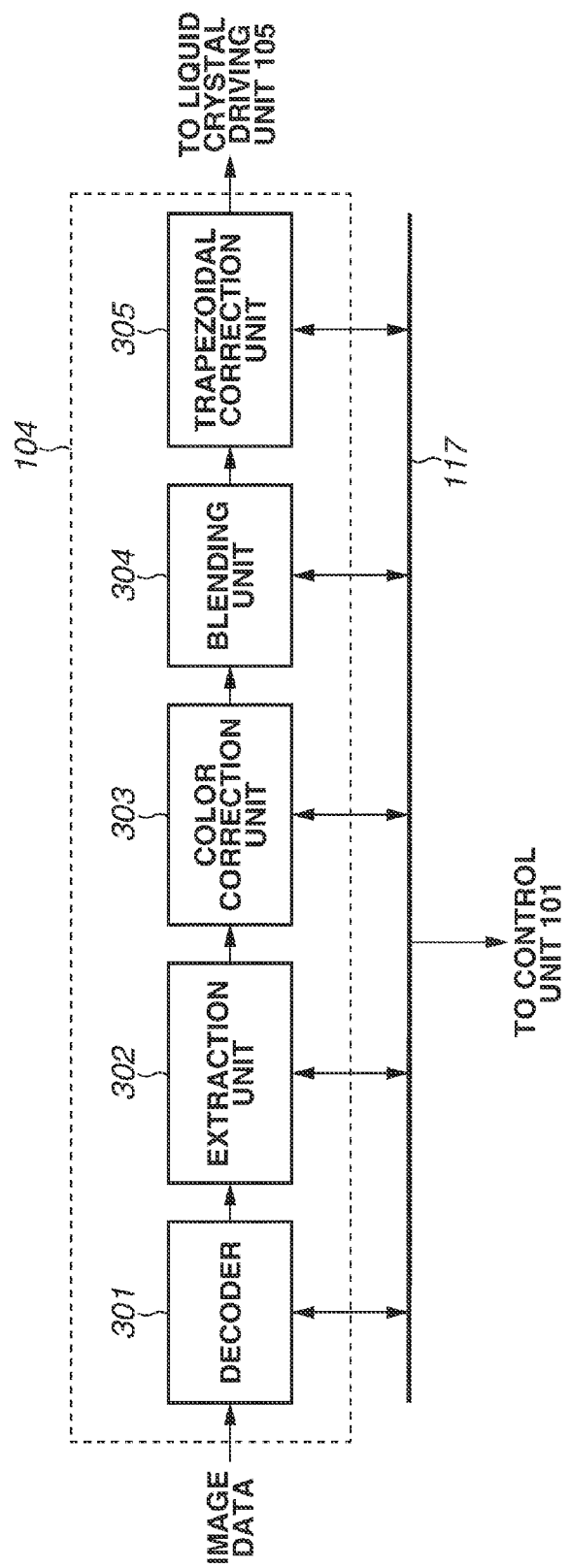
FIG. 3 illustrates a configuration of an image processing unit 104.

FIG. 3 illustrates a configuration of the image processing unit 104. The image processing unit 104 includes a decoder 301, an extraction unit 302, a color correction unit 303, a blending unit 304, and a trapezoidal correction unit 305. The decoder 301 can decode the image data A input via the bus 117.

Figure 4:
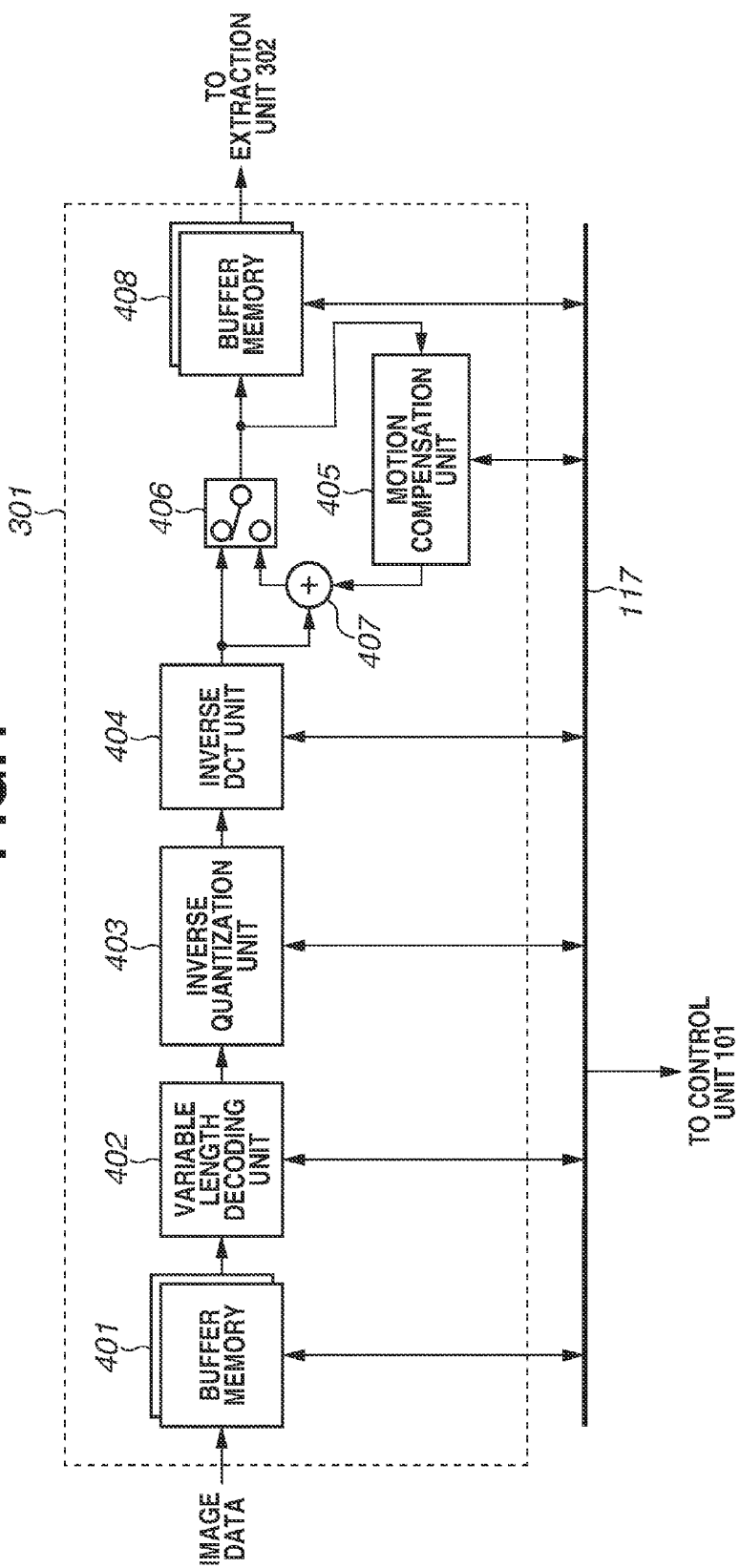
FIG. 4 illustrates a configuration of a decoder 301.

FIG. 4 illustrates a configuration of the decoder 301. The decoder 301 includes a buffer memory 401, a variable length decoding unit 402, an inverse quantization unit 403, and an inverse Discrete Cosine Transform (DCT) unit 404. The decoder 301 further includes a motion compensation unit 405, a switch 406, an addition unit 407, and a buffer memory 408.

The buffer memory 401 temporarily stores the image data A input to the decoder 301. The variable length decoding unit 402 reads out image data from the buffer memory 401, and decodes the read image data. The inverse quantization unit 403 dequantizes the image data decoded by the variable length decoding unit 402. The inverse DCT unit 404 subjects the image data, which has been dequantized by the inverse quantization unit 403, to inverse DCT conversion.

The motion compensation unit 405 outputs a difference value for motion compensation that has been calculated based on the image data input via the switch 406. The addition unit 407 adds an output value from the inverse DCT unit 404 and the difference value output from the motion compensation unit 405, and outputs a value after performing the addition to the switch 406.

The switch 406 switches image data to be output to the motion compensation unit 405 and the buffer memory 408. For example, the switch 406 selects image data output from the inverse DCT unit 404 when a frame serving as a decoding target is an I picture, and selects image data output from the addition unit 407 when a frame serving as a decoding target is a B picture or a P picture. The decoded image data output from the switch 406 is temporarily stored in the buffer memory 408. The image data stored in the buffer memory 408 are read out in a predetermined order.

Return to the description of FIG. 2. The extraction unit 302 extracts image data corresponding to an area where an image to be projected by the projector 100a is displayed from the image data A decoded by the decoder 301. In the example illustrated in FIG. 1, the extraction unit 302 in the projector 100a extracts image data corresponding to an image to be projected onto a screen 200a by the projector 100a from the image data A.

The color correction unit 303 corrects the color of the image data extracted by the extraction unit 302. The blending unit 304 corrects image data in an area that overlaps with an image to be projected by the other projector. For example, the blending unit 304 reduces the gain of image data in an area that overlaps with the image to be projected by the adjacent projector so that an uncomfortable feeling is eliminated between the overlapping area and the other area. The blending unit 304 gradually changes the gain in response to the instruction from the control unit 101 based on a user operation, for example.

The trapezoidal correction unit 305 deforms and corrects the projected image to cancel a trapezoidal distortion of the image displayed on the screen 200. The trapezoidal correction unit 305 outputs the projected image after the correction to the liquid crystal driving unit 105.

Figure 5A:
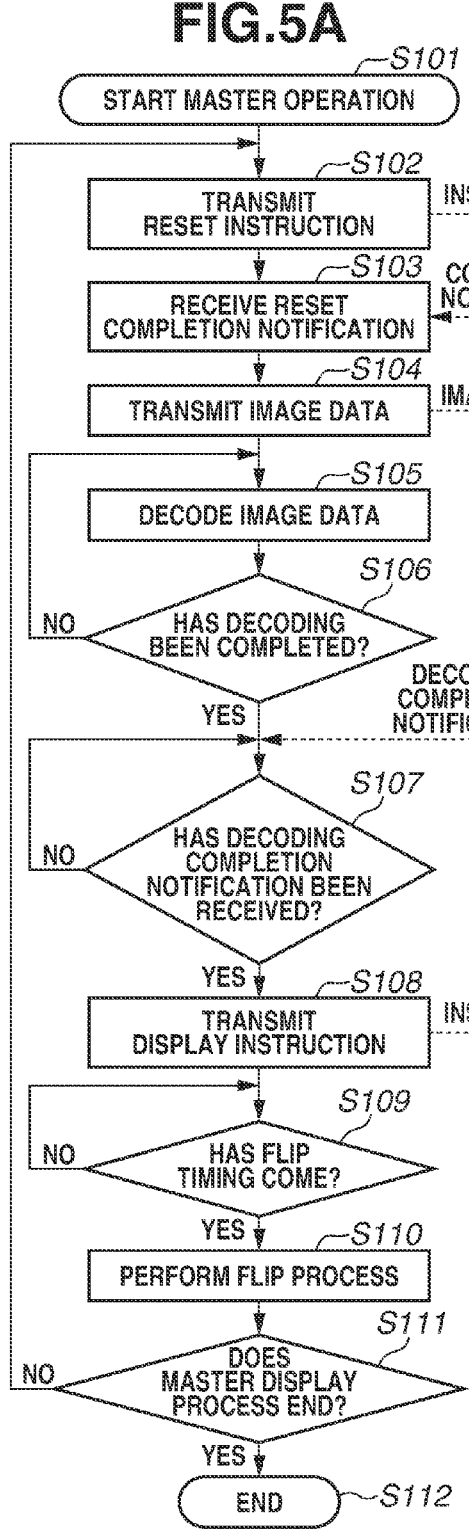
FIGS. 5A and 5B are respectively flowcharts for illustrating a master display process and a slave display process performed in the display system 1 in the first exemplary embodiment.
Figure 5B:
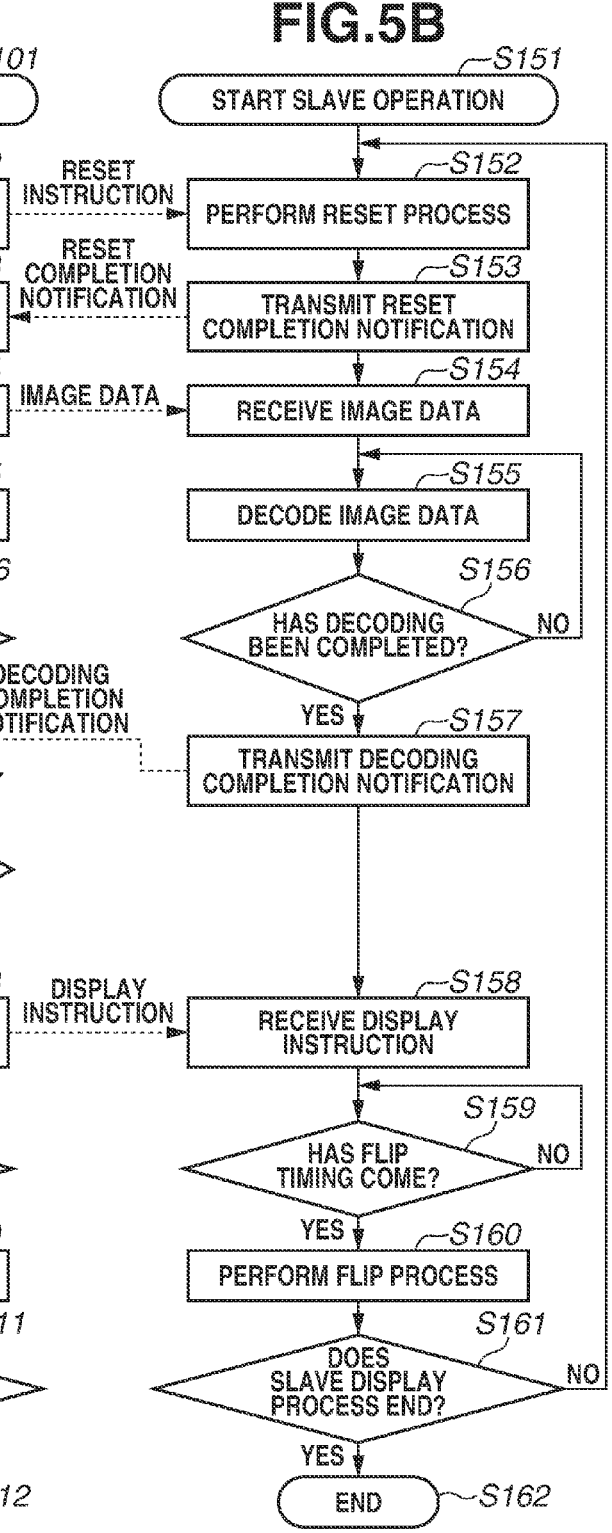

FIGS. 5A and 5B are flowcharts for illustrating a master display process and a slave display process performed in the display system 1 according to the first to fifth exemplary embodiments. FIG. 5A is a flowchart for illustrating the master display process performed in the projector 100a acting as a master device, and FIG. 5B is a flowchart for illustrating the slave display process performed in each of the projectors 100b to 100d acting as slave devices. In FIGS. 5A and 5B, a case where the image data is the still image data is assumed. Furthermore, the signal generation units 103 in the projector 100a and the projectors 100b to 100d in the first exemplary embodiment respectively generate vertical synchronization signals at the same frame rate.

The process performed in each of the projector 100a and the projectors 100b to 100d will be described below with reference to FIGS. 5A and 5B.

In step S101, the control unit in the projector 100 starts an operation as the master device. In step S151, the control unit 101 in each of the projectors 100b to 100d starts an operation as the slave device. In the projector 100a, the control unit 101 generates an instruction to reset vertical synchronization signal generated at a predetermined frame rate by the signal generation unit 103, in synchronization with the vertical synchronization signal. In step S102, the control unit 101 in the projector 100a transmits the reset instruction to each of the projectors 100b to 100d via the communication unit 115.

In step S152, the control unit 101 in each of the projectors 100b to 100d resets a generation timing of the vertical synchronization signal in the signal generation unit 103 when it receives the reset instruction from the projector 100a. The signal generation unit 103 starts to generate the vertical synchronization signal at an interval corresponding to the frame rate based on a timing of receipt of the reset instruction after resetting the generation timing of the vertical synchronization signal. Furthermore, the signal generation unit 103 starts to count using the counter how many times a leading edge or a trailing edge of the vertical synchronization signal is generated. In step S153, the control unit 101 in each of the projectors 100b to 100d transmits a reset completion notification to the projector 100a when a reset process by the signal generation unit 103 is completed.

In step S103, when the control unit 101 in the projector 100a then receives the reset completion notification from each of the projectors 100b to 100d, the control unit 101 in the projector 100a reads out the image data A from the USB memory 300 connected to the projector 100a. For example, the control unit 101 in the projector 100a reads out the image data A stored in a predetermined holder from the USB memory 300. The control unit 101 in the projector 100a inputs the read image data A to the image processing unit 104. In step S104, the control unit 101 in the projector 100a further transmits the image data A, which has been read out in step S103, to each of the projectors 100b to 100d via the communication unit 115. Furthermore, the control unit 101 in the projector 100a transmits area information indicating a decoding target area in the image data A to each of the projectors 100b to 100d.

In step S154, the control unit 101 in each of the projectors 100b to 100d receives the image data A and the area information, which have been transmitted by the projectors 100a the communication unit 115. The control unit 101 in each of the projectors 100b to 100d inputs the image data A and the area information, which have been received from the projector 100a, into the image processing unit 104.

In step S105, the control unit 101 in the projector 100a then causes the decoder 301 to decode the image data A. The decoder 301 extracts an area of an image to be projected by the projector 100a from the decoded image data A.

In step S155, the control unit 101 in each of the projectors 100b to 100d similarly causes the decoder 301 to decode the image data A. The decoder 301 extracts image data corresponding to an area indicated by the area information, which has been received from the projector 100a, from the decoded image data A.

In step S156, the control unit 101 in each of the projectors 100b to 100d then determines whether the decoding of the image data A and the extraction of the image data corresponding to the area to be projected from the image data A have been completed. If the control unit 101 in each of the projectors 100b to 100d determines that the decoding and the extraction have been completed (YES in step S156), the control unit 101 in each of the projectors 100b to 100d proceeds to step S157. In step S157, the control unit 101 in each of the projectors 100b to 100d transmits a decoding completion notification indicating that the decoding of the image data A has been completed as a preparation for displaying the project image to the projector 100a via the communication unit 115.

In step S106, the control unit 101 in the projector 100a determines whether the decoding in the projector 100a has been completed. If the control unit 101 in the projector 100a determines that the decoding in the projector 100a has been completed (YES in step S106), the control unit 101 in the projector 100a proceeds to step S107. In step S107, the control unit 101 in the projector 100a determines whether it has received the decoding completion notifications from all the projectors 100b to 100d. For example, if the control unit 101 in the projector 100a can receive the decoding completion notifications from all the projectors 100b to 100d (YES in step S107), it is determined that the decoding has been completed in all the projectors 100a to 100d.

In step S108, the control unit 101 in the projector 100a then transmits a display instruction including information indicating a timing of when the image data is flipped (hereinafter referred to as flip timing information) to each of the projectors 100b to 100d. In step S158, the control unit 101 in each of the projectors 100b to 100d receives the display instruction including the flip timing information transmitted from the projector 100a.

Flip will be described below. Flip is a process for switching image data to be projected. The decoder 301 in each of the projectors 100a to 100d stores the decoded image data in an area other than an area where the image data being projected is stored, of the buffer memory 408 based on the control of the control unit 101. The decoder 301 switches, when it receives an instruction to execute flip from the control unit 101, the image data to be output from the buffer memory 408, from image data being projected, to newly decoded image data to flip the image data. For example, the decoder 301 in each of the projectors 100b to 100d receives an instruction to execute flip from the control unit 101 at the timing indicated by the flip timing information received from the projector 100a.

In step S108, the control unit 101 in the projector 100a transmits a display instruction including information indicating at which timing of the vertical synchronization signal the image data is flipped as the flip timing information. For example, the control unit 101 in the projector 100a takes a count value, which indicates how many times a leading edge or a trailing edge of the vertical synchronization signal is generated after resetting the signal generation unit 103 in step S152, as the flip timing information.

In step S109, the control unit 101 in the projector 100a determines whether a timing of switching the image data output by the display unit 120 to new image data has come. If the control unit 101 in the projector 100a determines that the timing of switching the image data has come (YES in step S109), the control unit 101 in the projector 100a proceeds to step S110. In step S110, the control unit 101 in the projector 100a instructs the decoder 301 to switch image data read out of the buffer memory 408 from image data being projected to image data to be newly projected. Thus, the image data to be newly projected is flipped. The control unit 101 in the projector 100a controls the image processing unit 104 to output the flipped image data from the display unit 120.

In step S158, when the control unit 101 in each of the projectors 100b to 100d further receives the display instruction from the projector 100a, in step S159, the control unit 101 in each of the projectors 100b to 100d determines, whether the timing of the vertical synchronization signal corresponding to the received display instruction has come. If the control unit 101 in each of the projectors 100b to 100d determines that the timing of the vertical synchronization signal corresponding to the received display instruction has come (YES in step S159), the control unit 101 in each of the projectors 100b to 100d proceeds to step 3160. In step S160, the control unit 101 in each of the projectors 100b to 100d controls the decoder 301 to flip the image data in synchronization with the vertical synchronization signal corresponding to the display instruction. The control unit 101 in each of the projectors 100b to 100d controls the image processing unit 104 to output the flipped image data from the display unit 120. The control unit 101 in each of the projectors 100b to 100d may execute a flip process by inputting, among image data stored in the memory 116, the image data instructed by the display instruction, to the image processing unit 104.

Figure 6:
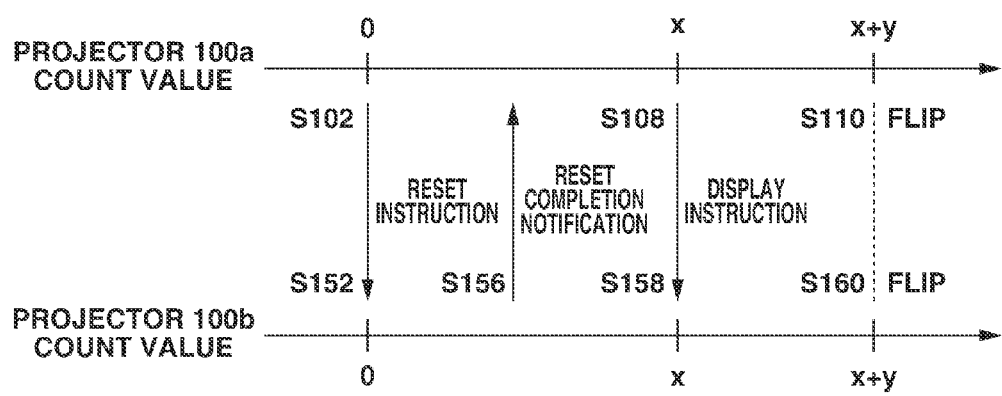
FIG. 6 illustrates a relationship between a display instruction and a flip timing.

FIG. 6 illustrates a relationship between a display instruction and a flip timing. In FIG. 6, when the respective signal generation units 103 in the projectors 100a to 100d simultaneously reset the vertical synchronization signals in steps S102 and S152, timings of the vertical synchronization signals match one another and count values in the counters of the signal generation units 103 become zero. The control unit 101 in each of the projectors 100b to 100d transmits a decoding completion notification to the projector 100a when decoding is completed. The control unit 101 in the projector 100a transmits, when the decoder 301 in each of the projectors 100a to 100d completes the decoding, a display instruction including flip timing information to the control unit 101 in the projector. The control unit 101 in the projector 100a can instruct the flip timing in the control unit 101 in each of the projectors 100b to 100d.

In FIG. 6, at a timing of when the projector 100a has issued the display instruction, the counter of the signal generation unit 103 in the projector 100a takes a count value x. Furthermore, a count value y is instructed as the flip timing in FIG. 6. When the count value in the signal generation unit 103 reaches (x+y), the control unit 101 in the projector 100a proceeds to step S110 and the control unit 101 in each of the projectors 100b to 100d proceeds to step S160. In steps S110 and S160, the control unit 101 executes a flip process, where x is a count value when the projector 100a has issued a display instruction, and y is a count value corresponding to a flip timing included in the display instruction. By the foregoing procedure, the projectors 100a to 100d can simultaneously switch the image data to be projected, by flipping the image data at the same timing.

Return to the description of FIGS. 5A and 5B. In step S111, the control unit 101 in the projector 100a determines, when it flips the image data in step S110, whether the master display process is ended. The control unit 101 in the projector 100a determines that the master display process is ended if all image data scheduled to be projected have already been displayed, and determines that the master display process is continued if the image data to be subsequently displayed remains. If the control unit 101 in the projector 100a determines that the master display process is continued (NO in step S111), the control unit 101 in the projector 100a returns to step S102. In step S102, the control unit 101 in the projector 100a resets the count value in the signal generation unit 103 and the generation timing of the vertical synchronization signal. The control unit 101 in the projector 100a may transmit the reset instruction to the projectors 100b to 100d based on a timing of the flip of the image data, and then causes the signal generation unit 103 to reset the generation timing of the vertical synchronization signal.

Similarly, in step S161, the control unit 101 in each of the projectors 100b to 100d determines, when it flips the image data in step S160, whether the slave display process is ended. For example, the control unit 101 in each of the projectors 100b to 100d determines that the slave display process is ended if it receives the instruction to end the slave display process from the projector 100a. For example, the control unit 101 in each of the projectors 100b to 100d determines that the slave display process is continued if it does not receive the instruction to end the slave display process from the control unit 101 in the projector 100a. If the control unit 101 in each of the projectors 100b to 100d determines that the slave display process is continued (NO in step S161), the control unit 101 in each of the projectors 100b to 100d returns to step S152. In step 152, the control unit 101 in each of the projectors 100b to 100d causes the signal generation unit 103 to reset the count value and the generation timing of the vertical synchronization signal.

As described above, in the display system 1 according to the first exemplary embodiment, the control of the control unit 101 in the projector 100a enables the signal generation unit 103 in each of the projectors 100b to 100d to reset the generation timing of the vertical synchronization signal. Furthermore, the control unit 101 in the projector 100a can transmit a display instruction indicating a timing of when the image data is flipped to the control unit 101 in each of the projectors 100b to 100d when the projectors 100b to 100d complete the decoding of the image data. The projectors 100a to 100d can perform the flip process for switching the image data based on the vertical synchronization signal generated after the generation timing of the vertical synchronization signal is reset.

Thus, in the display system 1 according to the first exemplary embodiment, the projectors 100a to 100d can simultaneously switch the image data displayed on the display unit 120 in a slide show by multi-projection. Therefore, in the display system 1 according to the first exemplary embodiment, an external device other than the projectors 100a to 100d for controlling respective timings of the projectors 100a to 100d is not required.

Furthermore, the display system 1 can prevent errors in the generation timing of the vertical synchronization signal among the projectors 100a to 100d, from accumulating by resetting the timing of the vertical synchronization signal every time the flip is completed.

While the display system 1 using the projectors 100a to 100d as the display apparatuses has been described in the first exemplary embodiment, the display apparatus is not limited to a projector. A display apparatus having no projection function may be used as the display apparatus in the first exemplary embodiment.

Furthermore, in the first exemplary embodiment, an order of a process for resetting the vertical synchronization signal and a process for decoding the image data may be replaced with each other.

A second exemplary embodiment will be described below. While the display system 1 according to the first exemplary embodiment displays a still image, the second exemplary embodiment differs from the first exemplary embodiment in that a display system according to the second exemplary embodiment displays not only a still image but also a moving image. A configuration of the projectors 100a to 100d illustrated in FIG. 2, a configuration of the image processing unit 104 illustrated in FIG. 2, and a configuration of the decoder 301 illustrated in FIG. 3 are also similar to the second exemplary embodiment.

FIG. 7 is a flowchart for illustrating a master display process performed in the projector 100a in the second exemplary embodiment. FIG. 8 is a flowchart for illustrating a slave display process performed in each of projectors 100b to 100d in the second exemplary embodiment. Steps S201 to 207 illustrated in FIG. 7 are similar to steps S101 to S107 illustrated in FIG. 5A. Steps S251 to S257 illustrated in FIG. 8 are similar to steps S151 to S157 illustrated in FIG. 5B.

FIGS. 9A and 9B respectively illustrate configuration examples of moving image data. FIG. 9A illustrates moving image data output during normal playback, and FIG. 9B illustrates moving image data output during fast-forward playback. When the decoder 301 in each of the projectors 100a to 100d decodes the moving image data, one or more frames each including any one of an I picture, a P picture, and a B picture are sequentially input, as illustrated in FIG. 9A, to a buffer memory 401. In FIG. 9A, a chick-line portion 801 is one Group of Pictures (GOP) frame, for example.

The decoder 301 decodes image data included in the moving image data using the procedure illustrated in the first exemplary embodiment. The decoder 301 replaces the respective orders of the frames with one another based on a predetermined rule depending on whether the I picture, the P picture, or the B picture is included in each of the frames. The decoder 301 outputs the moving image data indicated as output data illustrated in FIG. 9A from the buffer memory 408 after the respective orders of the frames are replaced with one another. When the moving image is fast-forward played back, the decoder 301 may output the moving image from the buffer memory 408 without replacing the order of the frames with one another, as illustrated in FIG. 9B.

Processes subsequent to the decoding process performed by the projector 100a in step S205 and processes subsequent to the decoding process performed by each of the projectors 100b to 100d in step S255 will be described below with reference to FIGS. 7 and 8.

After the decoding process in step S255 has been performed, in step S256, the control unit 101 in each of the projectors 100b to 100d determines whether decoding of image data corresponding to one frame has been completed and output of the image data after the decoding has been completed. If the control unit 101 in each of the projectors 100b to 100d determines that the decoding of the image data corresponding to one frame and the output of the image data after the decoding have been completed (YES in step S256), the control unit 101 in each of the projectors 100b to 100d proceeds to step S257. In step S257, the control unit 101 in each of the projectors 100b to 100d transmits a completion notification indicating that the decoding has been completed to the control unit 101 in the projector 100a via the communication unit 115.

As illustrated in FIG. 7, in step S206, the control unit 101 in the projector 100a determines whether the decoder 301 in the projector 100a has decoded image data corresponding to one frame. If the control unit 101 in the projector 100a determines that the decoder 301 in the projector 100a has decoded the image data corresponding to one frame (YES in step S206), the control unit 101 in the projector 100a proceeds to step S207. In step S207, the control unit 101 in the projector 100a determines whether decoding confirmation notifications have been received from all the projectors 100b to 100d. If the control unit 101 in the projector 100a determines that the decoding confirmation notifications have been respectively received from all the projectors 100b to 100d (YES in step S207), the control unit 101 in the projector 100a proceeds to step S208 in step S208, the control unit 101 in the projector 100a determines whether the decoder 301 has decoded still image data or moving image data.

If the control unit 101 in the projector 100a determines that the decoder 301 has decoded the still image data (YES in step S208), processes in steps S209 to S211 are executed. In step S209, the control unit 101 in the projector 100a transmits a display instruction including flip timing information to the control unit 101 in each of the projectors 100b to 100d. In step S210, the control unit 101 in the projector 100a then determines whether a flip timing has come. If the control unit 101 in the projector 100a determines that the flip timing has come (YES in step S210), the control unit 101 in the projector 100a proceeds to step S211. In step S211, the control unit 101 in the projector 100a controls the image processing unit 104, to execute a flip process.

If the control unit 101 in the projector 100a determines that the decoder 301 has decoded the moving image data (NO in step S208), the control unit 101 executes processes in steps S212 to S214. In step S212, the control unit 101 in the projector 100a transmits a display instruction to the control unit 101 in each of the projectors 100b to 100d. The display instruction includes read timing information indicating a timing of a vertical synchronization signal for reading out the image data corresponding to the predetermined frame, among image data corresponding to frames stored in the buffer memory 408.

If the image data corresponding to a frame 802 is displayed, for example, a display instruction includes read timing information indicating a read timing of the image data corresponding to the frame 802 stored in the buffer memory 408. In step S213, the control unit 101 in the projector 100a determines whether the read timing of the image data corresponding to the frame 802, which has been notified to the control unit 101 in each of the projectors 100b to 100d, has come. If the control unit 101 in the projector 100a determines that the read timing of the image data corresponding to the frame 802 has come (YES in step S213), the control unit 101 in the projector 100a proceeds to step S214. In step S214, the control unit 101 in the projector 100a reads out the image data corresponding to the frame 802 from the buffer memory 408.

In step S215, the control unit 101 in the projector 100a then determines whether the master display process is to be ended. If the control unit 101 in the projector 100a determines that the master display process is to be ended (YES in step S215), the control unit 101 in the projector 100a proceeds to step S214. In step S214, the master display process ends. If the control unit 101 in the projector 100a determines that the master display process does not end (NO in step S215), the control unit 101 in the projector 100a returns to step S202. In step S202, the control unit 101 in the projector 100a resets a generation timing of the vertical synchronization signal by the signal generation unit 103 in the projector 100a and a count value of the vertical synchronization signal in the signal generation unit 103 again. Furthermore, the control unit 101 in the projector 100a executes processes in step S202 and the subsequent steps. Thus, a reset instruction is transmitted to each of the frames from the control unit 101 in the projector 100a. Therefore, the generation timing of the vertical synchronization signal by the signal generation unit 103 in each of the projectors 100b to 100d and a count value of the vertical synchronization signal in the signal generation unit 103 are reset for each of the frames.

Processes performed after the control unit 101 in each of the projectors 100b to 100d transmits a decoding completion notification to the control unit 101 in the projector 100a in step S257 will be described below with reference to FIG. 8.

In step S258, the control unit 101 in each of the projectors 100b to 100d receives a display instruction including information indicating a predetermined buffer reading timing or a flip timing from the control unit 101 in the projector 100a. In step S259, the control unit 101 in each of the projectors 100b to 100d then determines whether a timing instructed by the information included in the display instruction has come. If the control unit 101 in each of the projectors 100b to 100d determines that the instructed timing has come (YES in step S259), the control unit 101 in each of the projectors 100b to 100d proceeds to step S260. In step S260, the control unit 101 in each of the projectors 100b to 100d determines whether the decoder 301 has decoded still image data.

If the control unit 101 in each of the projectors 100b to 100d determines that the decoder 301 has decoded the still image data (YES in step S260), the control unit 101 in each of the projectors 100b to 100d proceeds to step S261. In step S261, the control unit 101 in each of the projectors 100b to 100d controls the image processing unit 104 at the flip timing indicated by flip timing information included in the display instruction, which has been received in step S258, to perform the flip process. Thus, the control unit 101 in each of the projectors 100b to 100d can display image data after the switching on the display unit 120. The process in step S261 is similar to the process in step S160 illustrated in FIG. 5A. If the control unit 101 in each of the projectors 100b to 100d determines that the decoder 301 has decoded the moving image data (NO in step S260), the control unit 101 in each of the projectors 100b to 100d proceeds to step S262. In step S262, the control unit 101 in each of the projectors 100b to 100d reads out the image data corresponding to the frame 802 from the buffer memory 408 at the read timing indicated by the read timing information included in the display instruction that has been received in step S258.

In step S263, the control unit 101 in each of the projectors 100b to 100d then determines whether the slave display process is to be ended. If the control unit 101 in each of the projectors 100b to 100d determines that the slave display process is to be ended (YES in step S263), the control unit 101 in each of the projectors 100b to 100d proceeds to step S264. In step S264, the slave display process ends. If the control unit 101 in each of the projectors 100b to 100d determines that the slave display process does not end (NO in step S263), the control unit 101 in each of the projectors 100b to 100d returns to step S252. In step S252, the control unit 101 in each of the projectors 100b to 100d receives the reset instruction of the vertical synchronization signal generated by the signal generation unit 103 again from the control unit 101 in the projector 100a. The control unit 101 in each of the projectors 100b to 100d can reset the timing of the vertical synchronization signal generated by the signal generation unit 103 in the projector for each of the frames in synchronization with the signal generation unit 103 in the projector 100a when it receives the reset instruction.

As described above, in the display system 1 according to the second exemplary embodiment, the control unit 101 in the projector 100a transmits the display instruction to the control unit 101 in each of the projectors 100b to 100d for each of the frames. The signal generation unit 103 in each of the projectors 100b to 100d can reset the timing of the vertical synchronization signal in synchronization with the signal generation unit 103 in the projector 100a for each of the frames. Furthermore, when each of the projectors 100b to 100d completes the decoding of the image data corresponding to one frame, the control unit 101 in the projector 100a can transmit a display instruction including information indicating a timing of when the image data corresponding to the predetermined frame is displayed, to the other projectors. When the count value of the vertical synchronization signal in the signal generation unit 103 in each of the projectors 100b to 100d reaches a predetermined value, the projectors 100a to 100d can concurrently display the image data corresponding to the predetermined frame on the display unit 120.

Thus, in the display system 1 according to the second exemplary embodiment, when the moving image is multi-displayed, switching timings of the image data displayed by the projectors 100a to 100d can be coordinated. Therefore, in the display system 1 according to the second exemplary embodiment, an external device other than the projectors 100a to 100d for controlling respective timings of the projectors 100a to 100d is not required. Furthermore, the signal generation unit 103 in the projector 100a can prevent errors in the vertical synchronization signal generated by the signal generation unit 103 in each of the projectors 100b to 100d, from accumulating by resetting the vertical synchronization signal for each of the frames.

While an example in which the signal generation unit 103 resets the count value of the vertical synchronization signal in the signal generation unit 103 for each of the frames has been described in the second exemplary embodiment, a timing of when the count value is reset is not limited to this. For example, the signal generation unit 103 may reset the count value immediately after decoding an I picture illustrated in FIG. 9A. Furthermore, the timing of when the signal generation unit 103 resets the count value may be immediately after a predetermined number of GOPs have been decoded.

Furthermore, in the second exemplary embodiment, an order of a process for resetting the timing of the vertical synchronization signal and a process for decoding the image data may be replaced with each other.

A display system 1 according to a third exemplary embodiment differs from the display system 1 according to the first exemplary embodiment in that a reset instruction is transmitted at a timing based on a delay time. The delay time is a period of time obtained by summing a predetermined communication time and a predetermined processing time. The predetermined communication time is a communication period of time required until the reset instruction reaches control unit 101 in each of projectors 100b to 100d. The predetermined processing time is a processing period of time required until a signal generation unit 103 resets a generation timing of a vertical synchronization signal under the control of the control unit 101 in each of the projectors 100b to 100d. The configuration of the projectors 100a to 100d illustrated in FIG. 2, the configuration of the image processing unit 104 illustrated in FIG. 2, and the configuration of the decoder 301 illustrated in FIG. 3 are similar to those in the third exemplary embodiment.

A control unit 101 in a projector 100a in the third exemplary embodiment first transmits a measurement packet serving as measurement information for measuring the delay time to the control unit 101 in each of the projectors 100b to 100d. The control unit 101 in the projector 100a measures a time elapsed from transmitting the measurement packet until it receives a response packet corresponding to the measurement packet from the control unit 101 in each of the projectors 100b to 100d. The control unit 101 in the projector 100a transmits the reset instruction to the control unit 101 in each of the projectors 100b to 100d at a timing determined based on a delay time corresponding to each of the projectors 100b to 100d. Thus, the control unit 101 in the projector 100a synchronizes the signal generation unit 103 in the projector 100a with the signal generation unit 103 in each of the projectors 100b to 100d based on the delay time calculated based on the measured period of time.

Figure 10A:
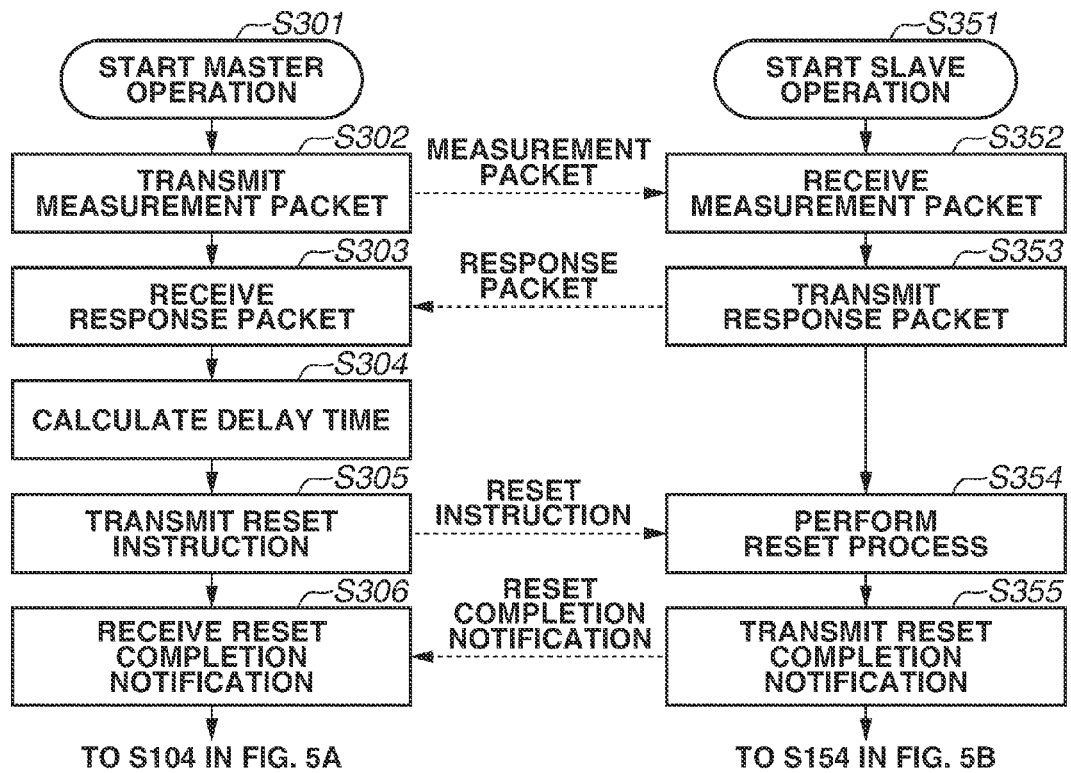
FIGS. 10A and 10B illustrate a master display process and a slave display process performed in the display system 1 according to the third exemplary embodiment.
Figure 10B:
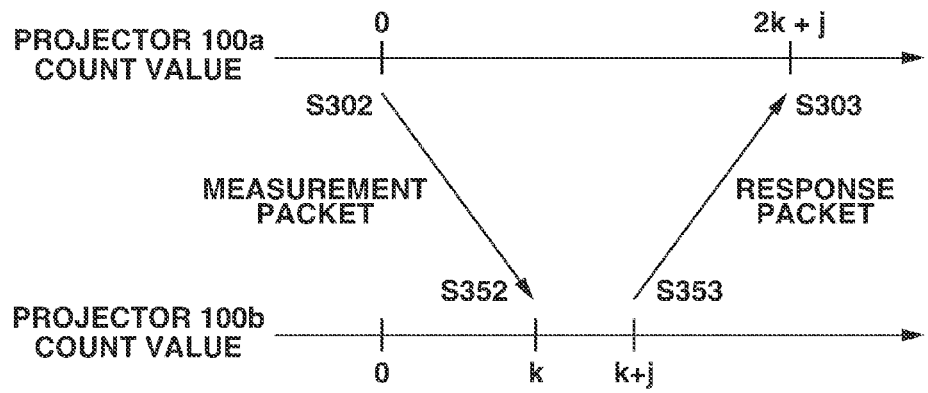

FIGS. 10A and 10B illustrate a master display process and a slave display process performed in the display system 1 according to the third exemplary embodiment. FIG. 10A is a flowchart for illustrating the master display process and the slave display process performed in the display system 1 according to the third exemplary embodiment. FIG. 10B illustrates a relationship on a time axis between a measurement packet and a response packet.

As illustrated in FIG. 10A, in step S302, the control unit 101 in the projector 100a transmits a measurement packet including a count value indicating a timing of vertical synchronization signal in the projector 100a as measurement information to the control unit 101 in each of the projectors 100b to 100d. In step S352, the control unit 101 in each of the projectors 100b to 100d receives the measurement packet. In step S353, the control unit 101 in each of the projectors 100b to 100d transmits a response packet for notifying the control unit 101 in the projector 100a that it has received the measurement packet, to the control unit 101 in the projector 100a. The response packet includes information each indicating a count value indicating a timing of the vertical synchronization signal generated by the signal generation unit 103 in each of the projectors 100b to 100d and a frequency of an operation clock as well as a count value included in the measurement packet.

In step S303, when the control unit 101 in the projector 100a receives the response packet, the control unit 101 calculates an elapsed time from transmitting the measurement packet until reception of the response packet, based on the information indicating the count value and the frequency of the operation clock which are included in the response packet. In step S304, the control unit 101 in the projector 100a calculates a delay time based on the elapsed time from transmitting the measurement packet until reception of the response packet.

In FIG. 10B, a count value in the signal generation unit 103 is set to zero when the control unit 101 in the projector 100a transmits the measurement packet. A communication time corresponding to a count number k has elapsed after the control unit 101 in the projector 100a transmits the measurement packet until the measurement packet reaches the control unit 101 in each of the projectors 100b to 100d.

Furthermore, a processing time corresponding to a count number j has elapsed after receiving the measurement packet until the control unit 101 in each of the projectors 100b to 100d transmits the response packet. Furthermore, a communication time corresponding to a count number k has elapsed after the control unit 101 in each of the projectors 100b to 100d transmits the response packet until the response packet reaches the control unit 101 in the projector 100a. As a result, a count value obtained when the control unit 101 in the projector 100a receives the response packet is (2k+j).

The control unit 101 in the projector 100a can calculate the count number k based on the calculated count value (2k+i) and the count number j corresponding to the processing time required until the control unit 101 in each of the projectors 100b to 100d transmits the response packet after receiving the measurement packet, which is previously stored in a memory 116. The control unit 101 in the projector 100a synchronizes a timing of when the generation timing of the vertical synchronization signal is reset, among the projectors 100a to 100d, by using the calculated count number k. For example, the control unit 101 in the projector 100a calculates count numbers kb, kc, and kd respectively corresponding to the projectors 100b to 100d. In step S305, the control unit 101 in the projector 100a transmits the reset instruction to the projector 100b earlier at a timing corresponding to the count number kb than a timing of when the signal generation unit 103 resets the generation timing of the vertical synchronization signal. In step S305, the control unit 101 in the projector 100a transmits the reset instruction to the projector 100c earlier at a timing corresponding to the count number kc than the timing of when the signal generation unit 103 resets the generation timing of the vertical synchronization signal. In step S305, the control unit 101 in the projector 100a transmits the reset instruction to the projector 100d earlier at a timing corresponding to the count number kd than the timing of when the signal generation unit 103 resets the generation timing of the vertical synchronization signal. In step S354, the control unit 101 in each of the projectors 100b to 100d resets the generation timing of the vertical synchronization signal in the signal generation unit 103 when it receives the reset instruction.

In step S355, the control unit 101 in each of the projectors 100b to 100d transmits a reset completion notification to the control unit 101 in the projector 100a. In step S306, the control unit 101 in the projector 100a receives the reset completion notification. Processes subsequent to step S306 are similar to the processes in steps S104 to S111 in FIG. 5A, and processes subsequent to step S355 are similar to the processes in steps S154 to S161 in FIG. 5B.

The control unit 101 in the projector 100a may transmit the reset instruction earlier at a timing based on the communication time corresponding to the count number k and the processing time corresponding to the count number j. For example, the control unit 101 in the projector 100a may transmit the reset instruction to the projector 100b a time (kb+j) earlier than the timing of when the signal generation unit 103 in the projector 100a resets the vertical synchronization signal. Furthermore, for example, the control unit 101 in the projector 100a may transmit the reset instruction to the projector 100c a time (kc+j) earlier than the timing of when the signal generation unit 103 in the projector 100a resets the vertical synchronization signal. Furthermore, for example, the control unit 101 in the projector 100a may transmit a reset instruction to the projector 100d a time (kd+j) earlier than the timing of when the signal generation unit 103 in the projector 100a resets the vertical synchronization signal.

Furthermore, the control unit 101 in the projector 100a may transmit a display instruction to the control units 101 in the projectors 100b to 100d at timings based on respective corresponding delay times. For example, the control unit 101 in the projector 100a may transmit a display instruction to the projector 100b a time kb or (kb+j) earlier than a timing of when the projector 100a flips image data. Furthermore, for example, the control unit 101 in the projector 100a may transmit the display instruction to the projector 100c a time kc or (kc+j) earlier than the timing of when the projector 100a flips the image data. Furthermore, for example, the control unit 101 in the projector 100a may transmit the display instruction to the projector 100d a time kd or (kd+j) earlier than the timing of when the projector 100a flips the image data.

Furthermore, the control unit 101 in the projector 100a may calculate the communication time and the delay time using a time measurement unit 102. It is useful for the control unit 101 to calculate the communication time and the delay time using the time measurement unit 102 when the communication time and the delay time are shorter than one clock of the vertical synchronization signal.

Furthermore, while a case where the projectors 100a to 100d output the still image data has been described above, the master display process and the slave display process in the third exemplary embodiment are also applicable to a case where each of the projectors 100a to 100d outputs moving image data. In this case, the control unit 101 in the projector 100a may measure a delay time every time it reads out image data included in the moving image data from a buffer memory 408.

Furthermore, the control unit 101 in the projector 100a may perform control to measure the delay time after causing the decoder 301 to decode the image data and reset the vertical synchronization signal in each of the projectors 100b to 100d based on the measured delay time.

As described above, the control unit 101 in the projector 100a in the third exemplary embodiment can measure the delay time elapsed until the control unit 101 in each of the projectors 100b to 100d receives and processes the measurement packet since the control unit 101 in the projector 100a transmits the measurement packet. The control unit 101 in the projector 100a may transmit the reset instruction earlier based on the measured delay time. Thus, even when the delay time occurs, the projectors 100a to 100d can synchronously switch the image data.

Furthermore, errors in the timing of the vertical synchronization signal can be prevented from accumulating when the delay time is measured every time the image data is read out of the buffer memory 408 or the image data is flipped.

A fourth exemplary embodiment differs from the first exemplary embodiment in that a generation timing of a vertical synchronization signal is adjusted based on a departure amount between a generation timing of the vertical synchronization signal in a projector 100a and a generation timing of the vertical synchronization signal in each of the projectors 100b to 100d. The configuration of the projectors 100a to 100d illustrated in FIG. 2, the configuration of the image processing unit 104 illustrated in FIG. 2, and the configuration of the decoder 301 illustrated in FIG. 3 are similar in the fourth exemplary embodiment.

Figure 11A:
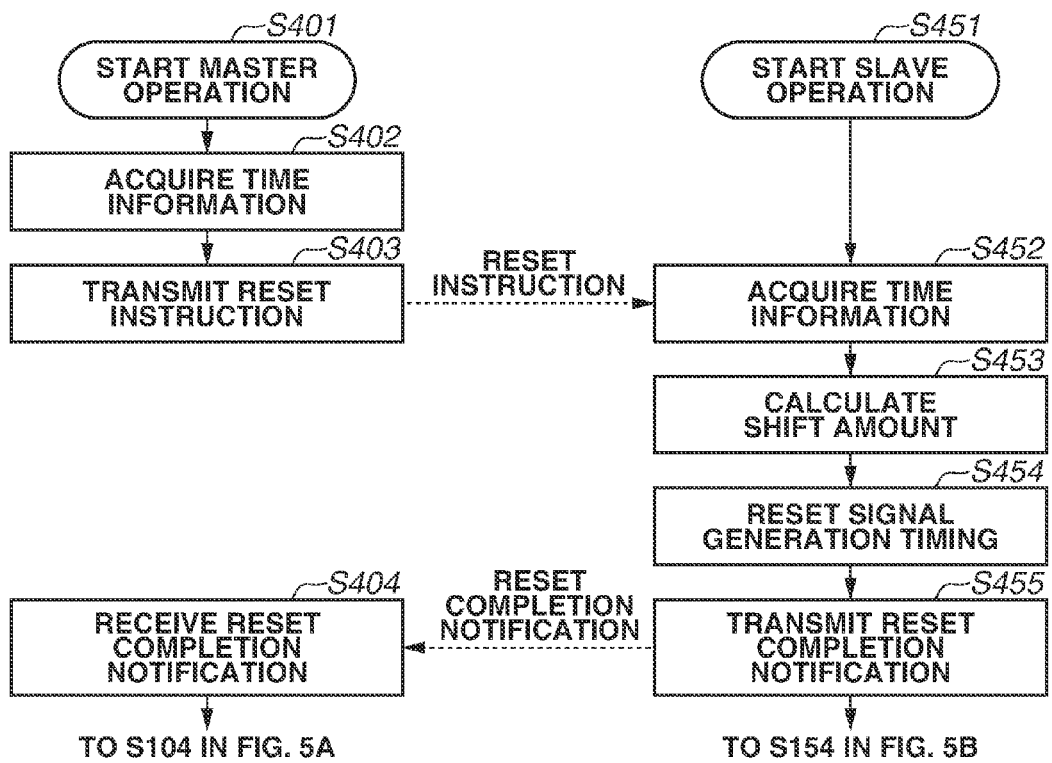
FIGS. 11A and 11B illustrate a master display process and slave display process performed in the display system 1 according to the fourth exemplary embodiment.
Figure 11B:
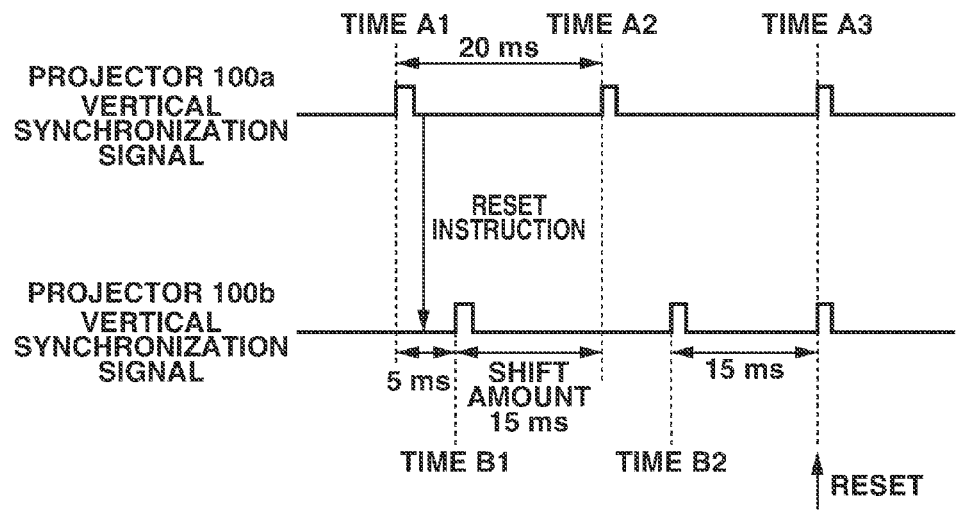

FIGS. 11A and 11B illustrate a master display process and a slave display process performed in a display system 1 according to the fourth exemplary embodiment. FIG. 11A is a flowchart for illustrating the master display process and the slave display process performed in the display system 1 according to the third exemplary embodiment. FIG. 11B illustrates an example of processing for adjusting a departure amount.

As illustrated in FIG. 11A, in step S402, a control unit 101 in the projector 100a in the fourth exemplary embodiment acquires time information from a time measurement unit 102 at the generation timing of the vertical synchronization signal. In step S403, the control unit 101 in the projector 100a then transmits a reset instruction including the time information which has been acquired in step S402, to a control unit 101 in each of the projectors 100b to 100d.

In step S452, the control unit 101 in each of the projectors 100b to 100d acquires the time information from a measurement unit 102 in the projector when it receives the reset instruction. In step S453, the control unit 101 in each of the projectors 100b to 100d calculates the departure amount based on a difference between the time information included in the reset instruction and the time information acquired from the time measurement unit 102.

In step S454, the control unit 101 in each of the projectors 100b to 100d resets, when it calculates the departure amount, the generation timing of the vertical synchronization signal based on the calculated departure amount. For example, the control unit 101 in each of the projectors 100b to 100d measures a period of time corresponding to the departure amount using a vertical synchronization signal generated after the departure amount is calculated, as a starting point. The control unit 101 in each of the projectors 100b to 100d causes a signal generation unit 103 to reset a timing of when the signal generation unit 103 generates the vertical synchronization signal at the time point when the time corresponding to the departure amount has elapsed.

In step S455, the control unit 101 in each of the projectors 100b to 100d transmits a reset completion notification to the control unit 101 in the projector 100a. In step S404, the control unit 101 in the projector 100a receives the reset completion notification. Processes subsequent to step S404 are similar to the processes in steps S104 to S111 in FIG. 5A, and processes subsequent to step S455 are similar to the processes in steps S154 to S161 in FIG. 5B.

An adjusting process performed between the projector 100a and the projector 100b will be described below with reference to FIG. 11B. For example, a generation interval of the vertical synchronization signal is 20 ms at a frame rate of 50 Hz, and a generation timing of the vertical synchronization signal in the projector 100b is 5 ms after generation of the vertical synchronization signal in the projector 100a. The control unit 101 in the projector 100a transmits a reset instruction at a time A1 when the vertical synchronization signal is generated. The control unit 101 in the projector 100b acquires time information from the time measurement unit 102 at the first generation timing of the vertical synchronization signal after receiving the reset instruction, and recognizes that the vertical synchronization signal is generated at a time B1.

The control unit 101 in the projector 100b subtracts the time A1 indicated by the time information included in the reset instruction from the time B1, to calculate a difference of 5 ms therebetween. Furthermore, the control unit 101 in the projector 100b calculates the departure amount as (20 ms−5 ms=15 ms) because the generation interval of the vertical synchronization signal is 20 ms. The control unit 101 in the projector 100b causes the signal generation unit 103 to reset the generation timing of the vertical synchronization signal at a timing that is delayed by 15 ms which is the departure amount from the time B2 when the vertical synchronization signal is generated immediately after receiving the reset instruction. Thus, the signal generation unit 103 in the projector 100b can generate the vertical synchronization signal at the same timing as the projector 100a, at a time A3. The signal generation unit 103 in each of the projectors 100c and 100d similarly changes the generation timing of the vertical synchronization signal. As a consequence, the generation timings of the vertical synchronization signals in the signal generation units 103 in the projectors 100a to 100d synchronize with one another.

Figure 12A:
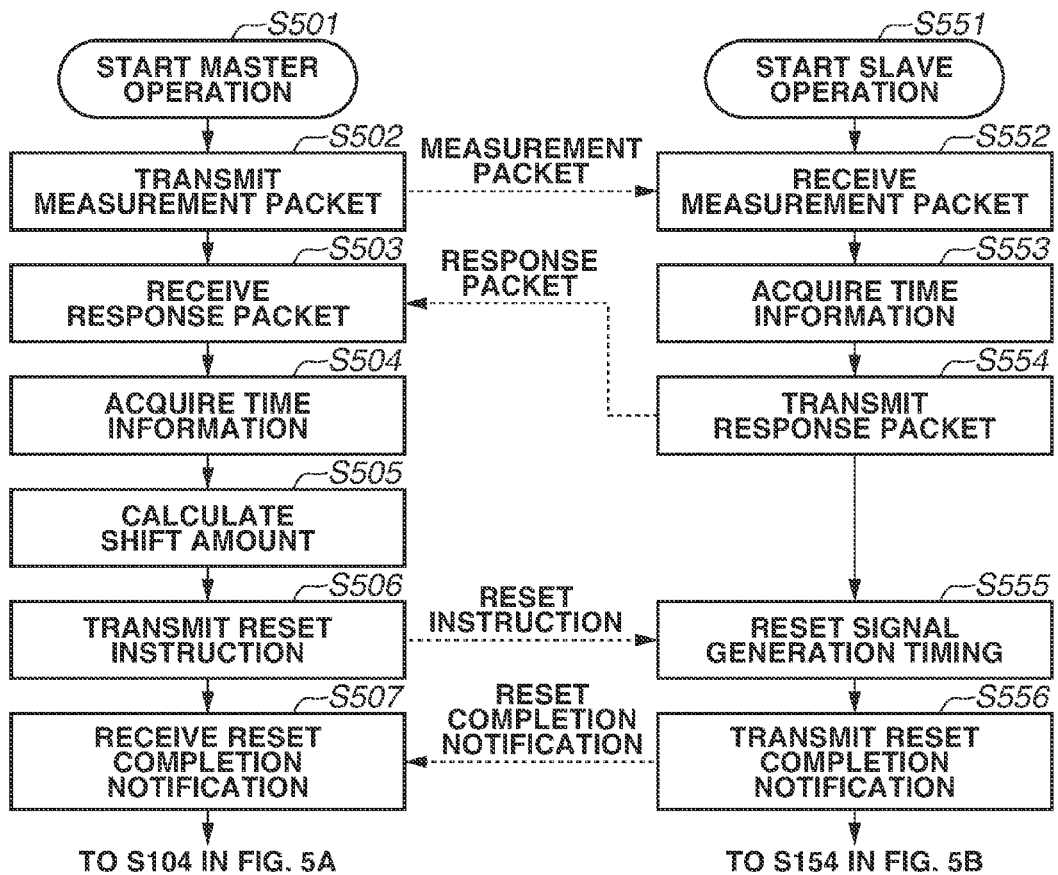
FIGS. 12A and 12B illustrate a master display process and a slave display process performed in the display system 1 according to a modified example of the fourth exemplary embodiment.
Figure 12B:
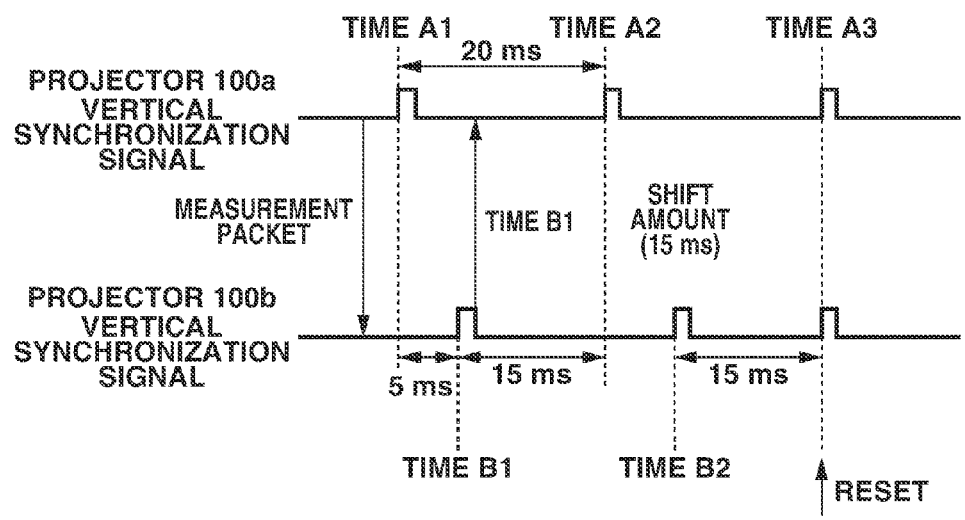

FIGS. 12A and 12B illustrate a master display process and a slave display process performed in the display system 1 in a modified example of the fourth exemplary embodiment. FIG. 12A is a flowchart for illustrating the master display process and the slave display process performed in the display system 1 in the modified example. FIG. 12B illustrates an example of processing for adjusting a departure amount in the modified example.

As illustrated in FIG. 12A, the control unit 101 in the projector 100a in the modified example of the fourth exemplary embodiment transmits a measurement packet for measuring a departure amount to the control unit 101 in each of the projectors 100b to 100d. In step S552, the control unit 101 in each of the projectors 100b to 100d receives the measurement packet. In step S553, the control unit 101 in each of the projectors 100b to 100d acquires time information from the time measurement unit 102 when the signal generation unit 103 generates a vertical synchronization signal. In step S554, the control unit 101 in each of the projectors 100b to 100d transmits a response packet including the acquired time information to the control unit 101 in the projector 100a.

In step S503, the control unit 101 in the projector 100a receives the response packet. In step S504, the control unit 101 in the projector 100a acquires the time information from the time measurement unit 102 when the signal generation unit 103 generates a vertical synchronization signal. In step S505, the control unit 101 in the projector 100a compares the acquired time information with the time information included in the response packet. Thus, the control unit 101 in the projector 100a calculates a departure amount between a timing of the vertical synchronization signal generated by the signal generation unit 103 in the projector 100a and a timing of the vertical synchronization signal generated by the signal generation unit 103 in each of the projectors 100b to 100d.

In step S506, the control unit 101 in the projector 100a then transmits a reset instruction including information indicating the calculated departure amount to the control unit 101 in each of the projectors 100b to 100d. In step S555, when the control unit 101 in each of the projectors 100b to 100d receives the reset instruction, the control unit 101 changes the generation timing of the vertical synchronization signal generated by the signal generation unit 103 based on the information indicating the departure amount included in the reset instruction. For example, the control unit 101 in each of the projectors 100b to 100d resets the generation timing of the vertical synchronization signal in the signal generation unit 103 at a timing corresponding to the departure amount. In step S556, the control unit 101 in each of the projectors 100b to 100d then transmits a reset completion notification to the control unit 101 in the projector 100a. In step S507, the control unit 101 in the projector 100a receives the reset completion notification. Processes subsequent to step S507 are similar to the processes in steps S104 to S111 in FIG. 5A, and processes subsequent to step S556 are similar to the processes in step S154 to S161 in FIG. 5B.

An adjusting process performed between the projector 100a and the projector 100b will be described below with reference to FIG. 12B. For example, a generation interval of a vertical synchronization signal is 20 ms at a frame rate of 50 Hz and a generation timing of a vertical synchronization signal in the projector 100b is 5 ms after a generation timing of a vertical synchronization signal in the projector 100a. The control unit 101 in the projector 100a transmits a measurement packet to the control unit 101 in each of the projectors 100b to 100d at any timing. The control unit 101 in the projector 100b transmits, at a time B1 which is a generation timing of the first vertical synchronization signal after receiving the measurement packet, a response packet notifying that the generation time of the vertical synchronization signal is the time B1. The control unit 101 in the projector 100a acquires a time A2 which is the time when the first vertical synchronization signal after receiving the response packet has been generated from the time measurement unit 102. The control unit 101 subtracts the time B1 from the time A2 to calculate the departure amount and acquires 15 ms.

The control unit 101 in the projector 100b then measures and acquires 15 ms from a timing of when the first vertical synchronization signal has been generated after the projector 100b receives the reset instruction, and resets the signal generation unit 103 when 15 ms has elapsed. Thus, the signal generation unit 103 in the projector 100b can generate the vertical synchronization signal at the same timing as the signal generation unit 103 in the projector 100a, at the time A3. The signal generation unit 103 in each of the projectors 100c and 100d similarly changes the generation timing of the vertical synchronization signal, so that the respective generation timings of the vertical synchronization signals in the signal generation units 103 in the projectors 100a to 100d synchronize with one another.

While a case where the projectors 100a to 100d output still image data has been described in the fourth exemplary embodiment, the master display process and the slave display process in the fourth exemplary embodiment are also applicable to a case where the projectors 100a to 100d output moving image data. In this case, the control unit 101 in the projector 100a may calculate a departure amount when image data included in the moving image data is read out of the buffer memory 408 or when the image data is flipped. The control unit 101 in the projector 100a periodically notifies the control unit 101 in each of the projectors 100b to 100d of the calculated departure amount, so that the departure amount can be maintained in a predetermined range.

As described above, the control unit 101 in the projector 100a in the fourth exemplary embodiment can measure the departure amount of the generation timing of the vertical synchronization signal between the projector 100a and the projectors 100b to 100d. Accordingly, the control unit 101 in each of the projectors 100b to 100d can change the generation timing of the vertical synchronization signal based on the departure amount. Thus, even when the generation timings of the vertical synchronization signals deviate, the projectors 100a to 100d can synchronously switch the image data.

While it is assumed in the first exemplary embodiment that the respective frame rates in the projectors 100a to 100d are the same, a fifth exemplary embodiment differs from the first exemplary embodiment in that it is assumed that respective frame rates in projectors 100a to 100d are not the same. A control unit 101 in the projector 100a in the fifth exemplary embodiment transmits reset instructions to a control unit 101 in each of the projectors 100b to 100d at a predetermined frame rate. The control unit 101 in each of the projectors 100b to 100d detects the frame rate in the projector 100a based on the reset instructions received from the control unit 101 in the projector 101. The control unit 101 in each of the projectors 100b to 100d causes a signal generation unit 103 to generate a vertical synchronization signal based on the detected frame rate.

Figure 13:
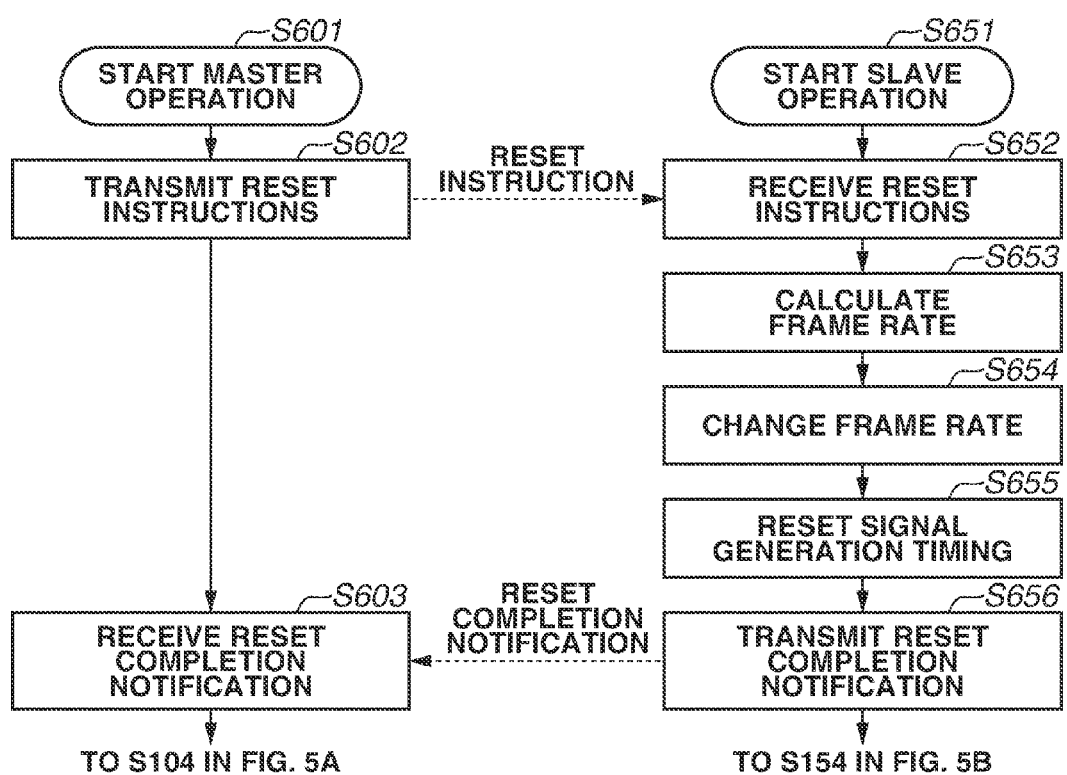
FIG. 13 illustrates a master display process and a slave display process performed in the display system 1 according to the fifth exemplary embodiment.

FIG. 13 is a flowchart for illustrating a master display process and a slave display process performed in the display system 1 according to the fifth exemplary embodiment. In step S602, the control unit 101 in the projector 100a transmits reset instructions in synchronization with a timing of a vertical synchronization signal in the projector 100a. In step S652, the control unit 101 in each of the projectors 100b to 100d receives the reset instructions. In step S653, the control unit 101 in each of the projectors 100b to 100d calculates a frame rate based on a time difference between respective timings at which it has received the reset instructions. When the time difference varies, the control unit 101 in each of the projectors 100b to 100d calculates the frame rate based on an average value of time differences.

In step S654, when the calculated frame rate differs from frame rates in the projectors 100b to 100d, the control units 101 in the projectors 100b to 100d respectively change the frame rate by changing a setting value in a counter of the signal generation unit 103. In step 655, the control unit 101 in each of the projectors 100b to 100d then resets a generation timing of the vertical synchronization signal by controlling the signal generation unit 103 based on the received reset instruction. In step S656, the control unit 101 in each of the projectors 100b to 100d transmits, when it has reset the generation timing of the vertical synchronization signal, a reset completion notification to the control unit 101 in the projector 100a. In step S603, the control unit 101 in the projector 100a receives the reset completion notification. Processes subsequent to step S603 are similar to the processes in steps S104 to S111 in FIG. 5A, and processes subsequent to step S656 are similar to the processes in steps S154 to S161 in FIG. 5B.

As described above, the control unit 101 in each of the projectors 100b to 100d in the fifth exemplary embodiment can detect the frame rate in the projector 100a based on the reset instructions transmitted from the control unit 101 in the projector 100a. The control units 101 in the projectors 100b to 100d can respectively adjust the frame rates in the projectors 100*b* to 100*d* according to the detected frame rate. Thus, respective generation periods of the vertical synchronization signals in the projectors 100*a* to 100*d* can be identical to each other. The control unit 101 in each of the projectors 100*b* to 100*d* may detect the frame rate based on packets of another type to be transmitted by the projector 100*a* in synchronization with the vertical synchronization signal.

Figure 14:
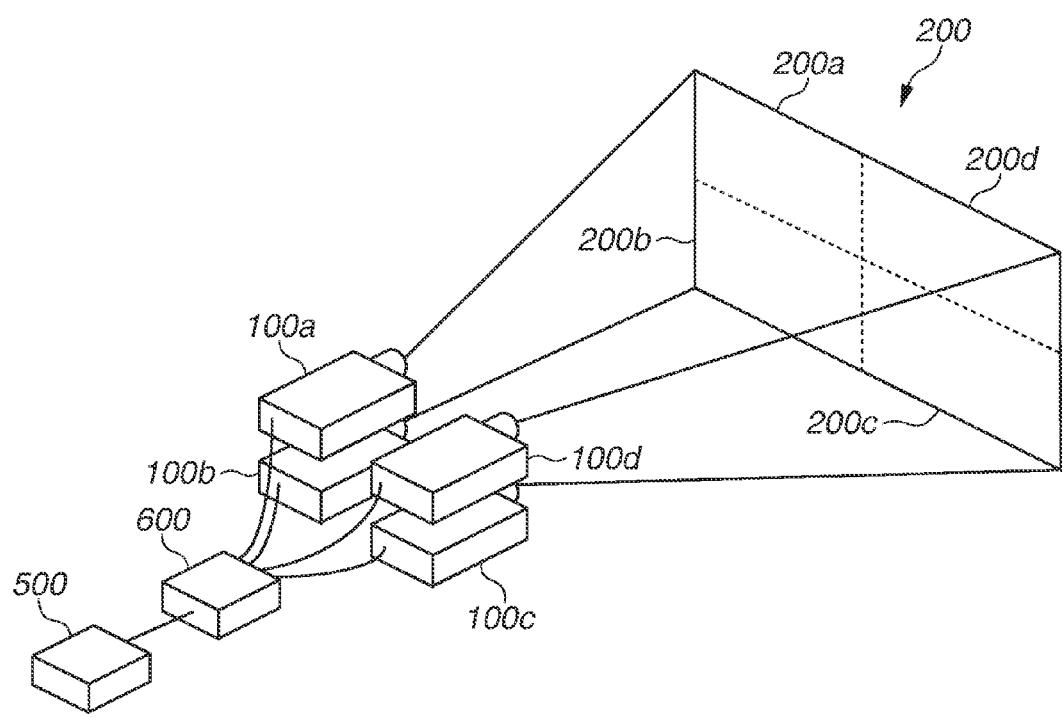
FIG. 14 illustrates a configuration of a display system 1 according to a sixth exemplary embodiment.

FIG. 14 illustrates a configuration of a display system 1 according to a sixth exemplary embodiment. The display system 1 according to the sixth exemplary embodiment differs from the display system 1 illustrated in FIG. 1 in that projectors 100*a* to 100*d* are connected to an image output device 500 via a distributor 600.

The image output device 500 includes a personal computer, a DVD player, a Blue-ray disk player, and a television tuner, and the projectors 100*a* to 100*d* output image data A which is a source of image data to be displayed on a screen 200. The distributor 600 distributes the image data A received from the image output device 500 to the projectors 100*a* to 100*d*.

The distributor 600 extracts, from the image data A received from the image output device 500, image data in areas corresponding to the projectors 100*a* to 100*d*. The distributor 600 transmits the image data extracted from the image data A to each of the projectors 100*a* to 100*d*. A procedure for controlling the projectors 100*b* to 100*d* by a control unit 101 in the projector 100*a* is similar to any one of procedures in the above described first to fifth exemplary embodiments.

As described above, the display system 1 according to the sixth exemplary embodiment extracts the image data in the areas corresponding to the projectors 100*a* to 100*d*. Therefore, each of the projectors 100*a* to 100*d* does not need to extract the image data corresponding to the predetermined area. Thus, a processing load on each of the projectors 100*a* to 100*d* can be reduced.

Various types of functions, processes, and methods described in the first to sixth exemplary embodiments can also be implemented by a personal computer, a microcomputer, and a central processing unit (CPU) using programs. In a seventh exemplary embodiment, the personal computer, the microcomputer, and the CPU are referred to as a "computer X" below. Furthermore, in the seventh exemplary embodiment, a program for controlling the computer X and for implementing the various types of functions, processes, and methods described in the first to sixth exemplary embodiments is referred to as a "program Y".

The various types of functions, processes, and methods described in the first to sixth exemplary embodiments are implemented by the computer X executing the program Y. In this case, the program Y is supplied to the computer X via a computer-readable storage medium. The computer-readable storage medium in the seventh exemplary embodiment includes at least one of a hard disk device, a magnetic storage device, an optical storage device, magneto-optical storage device, a memory card, a ROM, and a RAM. The computer-readable storage medium in the sixth exemplary embodiment is a non-transitory storage medium.

While the configuration in which the projector 100*a* reads out the image data A from the USB memory has been described in the first to seventh exemplary embodiments, the projector 100*a* is not limited to such configurations. For example, the projector 100*a* may be configured to read out the image data A from a storage medium other than the USB memory. For example, the projector 100*a* may be configured to read out the image data A from a recording media such as an SD card and a CompactFlash via a card interface unit 114. Furthermore, the projector 100*a* may acquire the image data A through a LAN via a communication unit 115.

While an example in which the vertical synchronization signal is used as a master timing signal and a slave timing signal has been described in the first to seventh exemplary embodiments, a signal other than the vertical synchronization signal may be used as the master timing signal and the slave timing signal.

While the present invention is described with reference to exemplary embodiments, it is to be understood that the present invention is not limited to the exemplary embodiments. The scope of the following claims is to be accorded the broadest interpretation so as to encompass all modifications and equivalent structures.

This application claims priority from Japanese Patent Application No. 2015-007830, filed Jan. 19, 2015, which is hereby incorporated by reference herein in its entirety.

What is claimed is:

1. A display system comprising:
 a master device that displays a master image corresponding to a part of image data; and
 a slave device that displays a slave image corresponding to another part of the image data,
 wherein the slave device includes:
 a slave signal generator that starts to generate a slave timing signal at a predetermined interval with reference to a timing based on a first instruction received from the master device;
 a slave communicator that transmits, after the receipt of the first instruction, to the master device a completion notification indicating that a preparation for displaying the slave image is completed; and
 a slave display that displays the slave image based on a second instruction which is received from the master device after the completion notification has been transmitted to the master device and which is in synchronization with the slave timing signal; and
 Wherein the master device includes:
 a master signal generator that generates a master timing signal at the predetermined interval;
 a master communicator that transmits the first instruction generated based on a generation timing of the master timing signal, and transmits the second instruction to the slave device after the completion notification is received from the slave device and a preparation for displaying the master image is completed; and
 a master display that displays the master image in synchronization with the master timing signal corresponding to the second instruction; and
 wherein the master communicator transmits the first instruction to the slave device at a predetermined frame rate, and wherein the slave signal generator detects a frame rate based on the first instruction received from the master device, and generates the slave timing signal based on the detected frame rate.

2. The display system according to claim 1, wherein the master communicator transmits the first instruction to the slave device at a timing earlier than a timing of when the master signal generator starts to generate the master timing signal.

3. The display system according to claim 1, wherein the slave signal generator changes a generation timing of the slave timing signal based on a departure amount between the generation timing of the slave timing signal and a generation timing of the master timing signal.

4. The display system according to claim 1, wherein the master communicator transmits the first instruction to the slave device at a timing corresponding to the slave device.

5. The display system according to claim 1, wherein the master communicator transmits the second instruction to the slave device at a timing corresponding to the slave device.

6. The display system according to claim 1, wherein the master communicator transmits the first instruction based on a timing of when the master device displays the master image.

7. The display system according to claim 1, wherein the master communicator transmits the first instruction based on a timing of when the master signal generator generates the master timing signal.

8. The display system according to claim 1, wherein the master communicator transmits the image data acquired from the outside to the slave device before transmitting the second instruction.

9. A display apparatus that displays an image in cooperation with another display apparatus, comprising:
   a communicator that performs communication with another display apparatus that displays a partial image corresponding to a part of image data, wherein the communicator receives an image corresponding to a part other than the part of the image data from the other display apparatus;
   a signal generator that generates a timing signal at a predetermined interval with reference to a first instruction received from the other display apparatus; and
   a controller that controls a display of the image received from the other display apparatus,
   wherein, after the receipt of the first instruction, the communicator transmits a completion notification indicating that a preparation for displaying the image received from the other display apparatus is completed to the other display apparatus, and
   wherein the controller performs control to cause the display apparatus to display the image received from the other display apparatus based on a second instruction which is received from the other display apparatus after the communicator has transmitted the completion notification to the other display apparatus and which is in synchronization with the timing signal.

10. The display apparatus according to claim 9, wherein the signal generator changes a generation timing of the timing signal based on a departure amount between time information included in the first instruction and a time setting of the display apparatus.

11. The display apparatus according to claim 9, wherein the signal generator generates the timing signal based on frame rate information included in the first instruction.

12. A display apparatus that displays an image in cooperation with another display apparatus, comprising:
   a display that displays a partial image corresponding to a part of image data; and
   a communicator,
   Wherein the communicator transmits an image corresponding to a part other than the part of the image data to the other display apparatus;
   wherein the communicator transmits, to the other display apparatus, a first instruction indicating a reference timing with reference to which a signal generator of the other display apparatus generates a timing signal at a predetermined interval;
   wherein, after transmitting the first instruction, the communicator receives, from the other display apparatus, a completion notification indicating that a preparation for displaying the image corresponding to the part other than the part of the image data is completed, and
   wherein, after receiving the completion notification, the communicator transmits, to the other display apparatus, a second instruction that is in synchronization with the timing signal so as to perform control to cause the other display apparatus to display the image transmitted to the other display apparatus.

13. The display apparatus according to claim 12, wherein the first instruction includes at least one of time information and frame rate information.

14. The display apparatus according to claim 12, wherein, before transmitting the second instruction to the other apparatus, the communicator transmits, to the other display apparatus, the image corresponding to the part other than the part of the image data.

* * * * *